US012754853B2

(12) United States Patent
Constable et al.

(10) Patent No.: US 12,754,853 B2
(45) Date of Patent: Oct. 6, 2026

(54) CIRCUITRY AND METHODS FOR IMPLEMENTING FORWARD-EDGE CONTROL-FLOW INTEGRITY (FECFI) USING ONE OR MORE CAPABILITY-BASED INSTRUCTIONS

(71) Applicant: Intel Corporation, Santa Clara, CA (US)

(72) Inventors: Scott D. Constable, Portland, OR (US); Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/194,086

(22) Filed: Mar. 31, 2023

(65) Prior Publication Data

US 2024/0330000 A1 Oct. 3, 2024

(51) Int. Cl.
*G06F 12/14* (2006.01)
*G06F 9/30* (2018.01)
*G06F 21/52* (2013.01)

(52) U.S. Cl.
CPC .......... *G06F 12/14* (2013.01); *G06F 9/30145* (2013.01); *G06F 21/52* (2013.01)

(58) Field of Classification Search
CPC ....... G06F 12/14; G06F 9/30145; G06F 21/52
See application file for complete search history.

(56) References Cited

U.S. PATENT DOCUMENTS

2018/0089468 A1 3/2018 Rozas et al.
2019/0012455 A1* 1/2019 Barnes .................. G06F 9/3013
(Continued)

OTHER PUBLICATIONS

Tice, C et al. Enforcing forward-edge control-flow integrity in GCC & LLVM. Proceedings of the 23rd USENIX conference on Security Symposium, pp. 941-955, Aug. 2014, [retrieved on Apr. 28, 2026]. Retrieved from <URL: https://www.usenix.org/system/files/conference/usenixsecurity14/sec14-paper-tice.pdf>.*

(Continued)

*Primary Examiner* — Shawn Doman
(74) *Attorney, Agent, or Firm* — NICHOLSON DE VOS WEBSTER & ELLIOTT LLP

(57) ABSTRACT

Techniques for implementing forward-edge control-flow integrity (FECFI) using capability instructions in a hardware processor are described. In certain examples, a hardware processor (e.g., core) includes a capability management circuit to check a capability for a memory access request for a memory, the capability comprising an address field and a bounds field that is to indicate a lower bound and an upper bound of an address space to which the capability authorizes access; a decoder circuit to decode a single instruction into a decoded single instruction, the single instruction comprising: a first capability to indicate a first call table comprising a respective entry for each of a plurality of functions of a first type, a field to indicate a first offset of a first entry for a first function requested for execution, and an opcode to indicate the capability management circuit is to perform a first check that the first offset is within a lower bound and an upper bound of the first capability and a second check that the first offset is a permitted offset for the entries in the first call table, and in response to the first check and the second check both passing, cause an execution circuit to execute the first function; and the execution circuit to execute the decoded single instruction according to the opcode.

20 Claims, 19 Drawing Sheets

(56) References Cited

U.S. PATENT DOCUMENTS

| | | | | |
|---|---|---|---|---|
| 2022/0058023 | A1* | 2/2022 | Lemay | G06F 9/449 |
| 2022/0114102 | A1* | 4/2022 | Wang | G06F 12/1009 |
| 2022/0197658 | A1 | 6/2022 | Agron | |
| 2023/0195360 | A1 | 6/2023 | Michael et al. | |
| 2023/0315452 | A1 | 10/2023 | Constable | |
| 2024/0086579 | A1 | 3/2024 | Ayrapetyan et al. | |
| 2024/0111539 | A1 | 4/2024 | Agron et al. | |
| 2024/0289495 | A1 | 8/2024 | Asanovic | |

OTHER PUBLICATIONS

Carruth, C., "Speculative Load Hardening: A Spectre Variant #1 Mitigation Technique," Sep. 2018, 17 pages. [Online]. Available: https://llvm.org/docs/SpeculativeLoadHardening.html.

Cimpanu, C., "Chrome: 70% of All Security Bugs are Memory Safety Issues," ZDNet, May 22, 2020, 5 pages. [Online]. Available: https://www.zdnet.com/article/chrome-70-of-all-security-bugs-are-memory-safety-issues/.

Cimpanu, C., "Microsoft: 70 Percent of All Security Bugs are Memory Safety Issues," ZDNet, Feb. 11, 2019, 4 pages. [Online]. Available: https://www.zdnet.com/article/microsoft-70-percent-of-all-security-bugs-are-memory-safety-issues/.

Intel Corporation, "Bounds Check Bypass / CVE-2017-5753 / INTEL-SA-00088," Jan. 3, 2018, 5 pages. [Online]. Available: https://www.intel.com/content/www/us/en/developer/articles/technical/software-security-guidance/advisory-guidance/bounds-check-bypass.html.

Kirzner, O., et al., "An Analysis of Speculative Type Confusion Vulnerabilities in the Wild," in 30th USENIX Security Symposium (USENIX Security 21), Aug. 2021, 19 pages.

Watson, R. et al., "Capability Hardware Enhanced RISC Instructions (CHERI)", available online at <https://www.cl.cam.ac.uk/research/security/ctsrd/cheri/>, Dec. 2019, 2 pages.

Watson, R. et al., "Capability Hardware Enhanced RISC Instructions: CHERI Instruction-Set Architecture (Version 8)", University of Cambridge, Computer Laboratory, Technical Report, No. 951, Oct. 2020, 590 pages.

Notice of Allowance, U.S. Appl. No. 18/194,010, Jul. 6, 2026, 10 pages.

* cited by examiner

CIRCUITRY AND METHODS FOR IMPLEMENTING FORWARD-EDGE CONTROL-FLOW INTEGRITY (FECFI) USING ONE OR MORE CAPABILITY-BASED INSTRUCTIONS

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF DRAWINGS

Various examples in accordance with the present disclosure will be described with reference to the drawings, in which.

DETAILED DESCRIPTION

Figure 1:
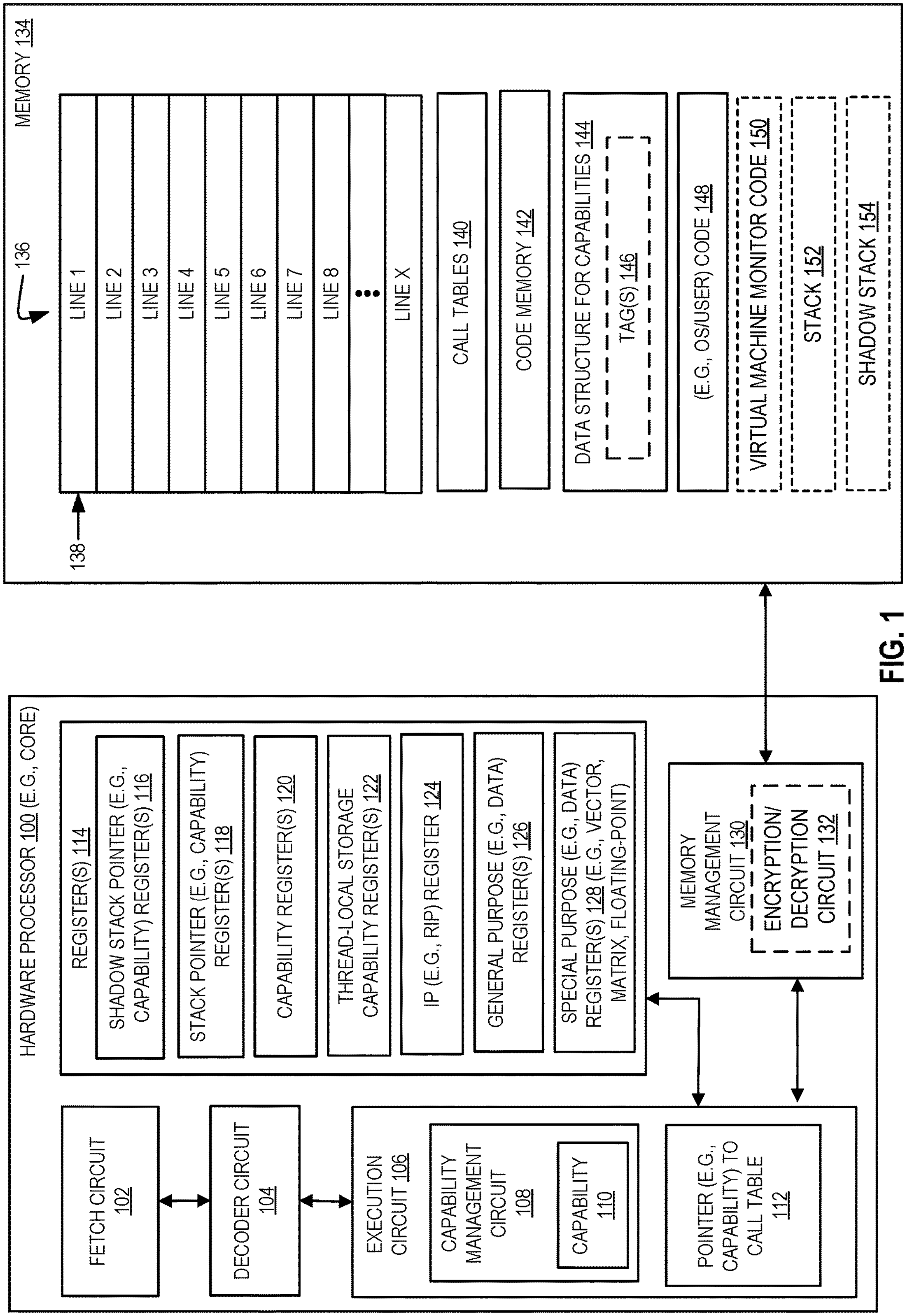
FIG. 1 illustrates a block diagram of a hardware processor including a capability management circuit and coupled to a memory that can store a plurality of call tables of different types according to examples of the disclosure.

The present disclosure relates to methods, apparatus, systems, and non-transitory computer-readable storage media for forward-edge control-flow integrity (FECFI) using capability instructions. According to some examples herein, forward control-flow integrity (forward CFI or "FECFI") is implemented by functions and jump tables typed using capabilities. According to some examples herein, an instruction set architecture (ISA) that includes one or more capability instructions is utilized to enforce FECFI. According to some examples herein, an extension is added to an ISA that includes one or more capability instructions to facilitate efficient FECFI.

Memory-safety and type-safety vulnerabilities continue to be pervasive for foundational software layers, including operating systems, the network stack, web browsers, and device drivers. By some estimates, around 70% of all security vulnerabilities continue to be memory-safety and type-safety vulnerabilities. One probable reason why is that the semantic gap between software and hardware has not been narrowed in certain ISAs.

A processor, such as a hardware processor (e.g., having one or more cores), may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. In certain examples, a computer includes a hardware processor requesting access to (e.g., load or store) data and the memory is local (or remote) to the computer. A system may include a plurality of cores, for example, with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM), for example, accessible according to a Peripheral Component Interconnect Express (PCIe) standard.

Memory may be divided into separate blocks (e.g., one or more cache lines), for example, with each block managed as a unit for coherence purposes. In certain examples, a pointer (e.g., data pointer) (e.g., pointer to an address) is a value that refers to (e.g., points to) the location of data, for example, a pointer may be an (e.g., virtual) address and that data is (or is to be) stored at that address (e.g., at the corresponding physical address). In certain examples, memory is divided into multiple lines, e.g., and each line has its own (e.g., unique) address. For example, a line of memory may include storage for 512 bits, 256 bits, 128 bits, 64 bits, 32 bits, 16 bits, or 8 bits of data, or any other number of bits.

In certain examples, memory corruption (e.g., by an attacker) is caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain examples herein utilize memory corruption detection (MCD) hardware and/or methods, for example, to prevent an out-of-bound access or an access with a dangling pointer. In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a context switch for an access). Certain examples implement a capability-based addressing scheme by extending the data storage (for example, extending memory (e.g., and register) addressing) with an additional bit (e.g., writable only if permitted by the capability management circuit) that indicates that a particular location is protected and referenced by a capability, for example, such that all memory accesses (e.g., loads, stores, and/or instruction fetches) to the particular location must be authorized by the capability or be denied. Additionally or alternatively, certain examples implement capabilities by extending the data storage (for example, extending memory (e.g., and registers)) with an additional bit (e.g., writable only if permitted by the capability management circuit) that indicates the data storage stores a capability, for example, where a first capability (that protects a first memory location referenced by the first capability) is stored in a second memory location, and the second memory location is protected and referenced by a second capability. Example formats of capabilities are discussed below in reference to FIGS. 2A and 2B.

Thus, certain ISA designs may include more semantic information to become exposed to hardware. One example is where a capability is used to bounds-check pointers, e.g., as a primitive datatype recognized by the processor. Hence, the hardware can know when data (e.g., a 128-bit wide "word" of data) in memory corresponds to a pointer, and moreover the hardware can also know the memory bounds within which the pointer can access data. For background, FIG. 2B shows a (e.g., 128-bit) capability, which consists of an (e.g., 64-bit) address (e.g., pointer) combined with bounds information and other metadata that can be used for enforcing other fine-grained access control policies. In certain examples, each instance of a capability also has an associated (e.g., 1-bit) validity tag that is guarded within processor-protected memory, e.g., where this tag serves as a tamper-proof type of indicator that indicates that a given section (e.g., 128-bit word) in memory is a capability. In certain examples, capabilities are an extension to an instruction set to introduce operations that create and destroy capabilities, use capabilities to store and load data, manipulate capability permissions, etc.

Certain capability-based ISAs (e.g., cryptographic capability computing) use encrypted pointers to enforce fine-grained access control on objects in memory, e.g., where new instructions are used to construct and use these pointers (e.g., enforcing capability checks for memory access instructions).

To prevent program data corruption from affecting a program's forward control-flow edges (for example, indirect calls), certain computing technology utilizes forward-edge control-flow integrity (FECFI).

Figure 3:
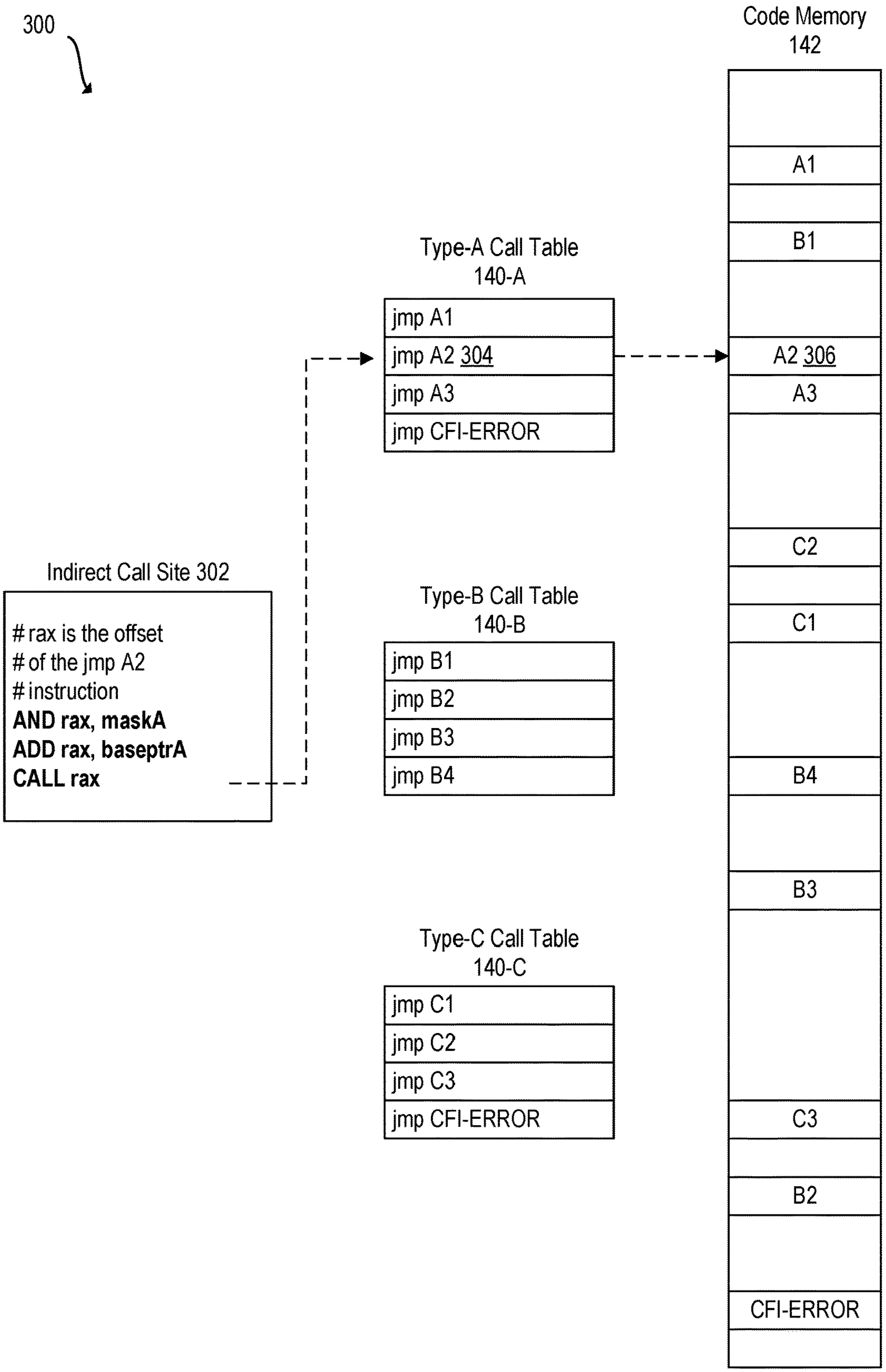
FIG. 3 illustrates a flow of an indirect function-call check (IFCC) via non-capability instructions for a memory having a plurality of call tables of different types according to examples of the disclosure.

Two example FECFI techniques (e.g., implemented for Linux operating system) are "Clang-CFI" and FineIBT. In the first set of examples, Clang-CFI includes a feature known as Indirect Function-Call Checks (IFCC), a software technique that uses link-time optimization (LTO) to coalesce indirect call targets that share the same type. In certain examples, this prevents, for example, a function pointer of type A from branching to a function of type B. For example, on x86 ISA, where all indirect function calls are replaced by the instruction sequence;

```
and rax, maskA
add rax, baseptrA
call DWORD PTR [rax]
```

where baseptrA points to the jump table of type-A functions, register rax is the jump table offset corresponding to the function that will be called, the number of set bits in maskA is equal to $\lceil \log_2|A| \rceil$ (e.g., the ceiling function of $\log_2|A|$) where $|A|$ is the number of type-A functions, e.g., in the entire program. In certain examples, the low-order $\log_2$ align bits of the mask are set to 0, where align is the size of a pointer in bytes (for example, on x86-64, align=8). For example, if the jump table of type-A functions contains 4 entries and align=8, then maskA=11000b. In certain examples, each table is padded to a power of two, e.g., where the padding consists of jumps to an error handling routine. In certain examples, IFCC does not ensure that the correct function is called, only that a function of the correct type is called. An example of an IFCC technique is illustrated in FIG. 3. In certain examples, the application of baseptrA and maskA to the target offset in rax enforces that the indirect call destination will be: (i) at least the address of baseptrA (the base of the Type-A call table), (ii) no more than $(|A|-1)$*align bytes above baseptrA, and (iii) aligned to the machine's function pointer size.

In the second set of examples, FineIBT is a software application binary interface (ABI) that utilizes (e.g., Intel®) Control-flow Enforcement Technology—Indirect Branch Tracking (CET-IBT) of a processor. In certain examples, CET-IBT ensures that the forward edge reaches a valid target, and the FineIBT ABI requires that each valid target must perform a check that (e.g., a hash of) its type matches (e.g., a hash of) the type of the function pointer that called it, e.g., to prevent a function pointer of type A from branching to a function of type B.

In certain examples, CFI is to ensure that code follows a program, e.g., no buffer overflows.

Certain ISAs are according to a reduced instruction set computer (RISC) architecture, e.g., according to a RISC-V standard. Certain capabilities (e.g., according to a Capability Hardware Enhanced RISC Instructions (CHERI) standard) provide coarse-grained control-flow integrity (CFI), e.g., using capabilities to architecturally bound the scope of a function, library, software sandbox, subprocess, etc. However, certain capabilities (e.g., according to a CHERI standard) lack a compelling and efficient FECFI solution. For example, in certain implementations, Clang-CFI and FineIBT have relatively low overheads and can significantly improve security, which makes them suitable to deploy in software. However, certain processors do not include CET-IBT (and thus may not implement FineIBT) and/or do not offer comprehensive CFI or memory safety solutions, and therefore are not amenable to certain architectures (e.g., a CHERI ISA and/or cryptographic capability computing ISA).

Examples herein overcome the issues discussed herein by utilizing circuitry and methods for implementing forward-edge control-flow integrity (FECFI) using one or more capability-based instructions. Certain examples herein utilize one or more capability instructions (e.g., an extension thereto) to enforce indirect function-call checks, e.g., including a new application binary interface (ABI) that can be adopted by compilers, managed runtimes, just-in-time compilers, etc. Certain examples herein utilize one or more capability instructions to enable ABIs that enforce indirect function-call checks. Examples herein provide enhanced security, e.g., security hardening an ISA, by allowing for the (e.g., efficient) enforcement of indirect function-call checks. Although certain examples herein discuss an x86 ISA format for an instruction, it should be understood that the descriptions herein can be generalized to other implementations (e.g., ISA formats such as, but not limited to, a CHERI based ISA). Also note that certain assembly code examples herein use x86 ISA assembly syntax conventions where the destination register/memory precedes the source register/memory.

The instructions disclosed herein are improvements to the functioning of a processor (e.g., of a computer) itself because they implement the above functionality by electrically changing a general-purpose computer (e.g., the decoder circuit and/or the execution circuit thereof) by creating electrical paths within the computer (e.g., within the decoder circuit and/or the execution circuit thereof). These electrical paths create a special purpose machine for carrying out the particular functionality.

The instructions disclosed herein are improvements to the functioning of a processor (e.g., of a computer) itself. Instruction decode circuitry (e.g., decoder circuit 104) not having such an instruction as a part of its instruction set would not decode as discussed herein. An execution circuit (e.g., execution circuit 106) not having such an instruction as a part of its instruction set would not execute as discussed herein. For example, a forward-edge control-flow integrity (FECFI) capability-based instruction, e.g., an indirect function call capability-based instruction. Examples herein are improvements to the functioning of a processor (e.g., of a computer) itself as they provide enhanced security (e.g., security hardening).

Turning now to the figures, FIG. 1 illustrates a block diagram of a hardware processor 100 (e.g., core) including a capability management circuit 108 and coupled to a memory 134 to store (e.g., when powered on) a plurality of call tables 140 of different types according to examples of the disclosure.

Figure 4:
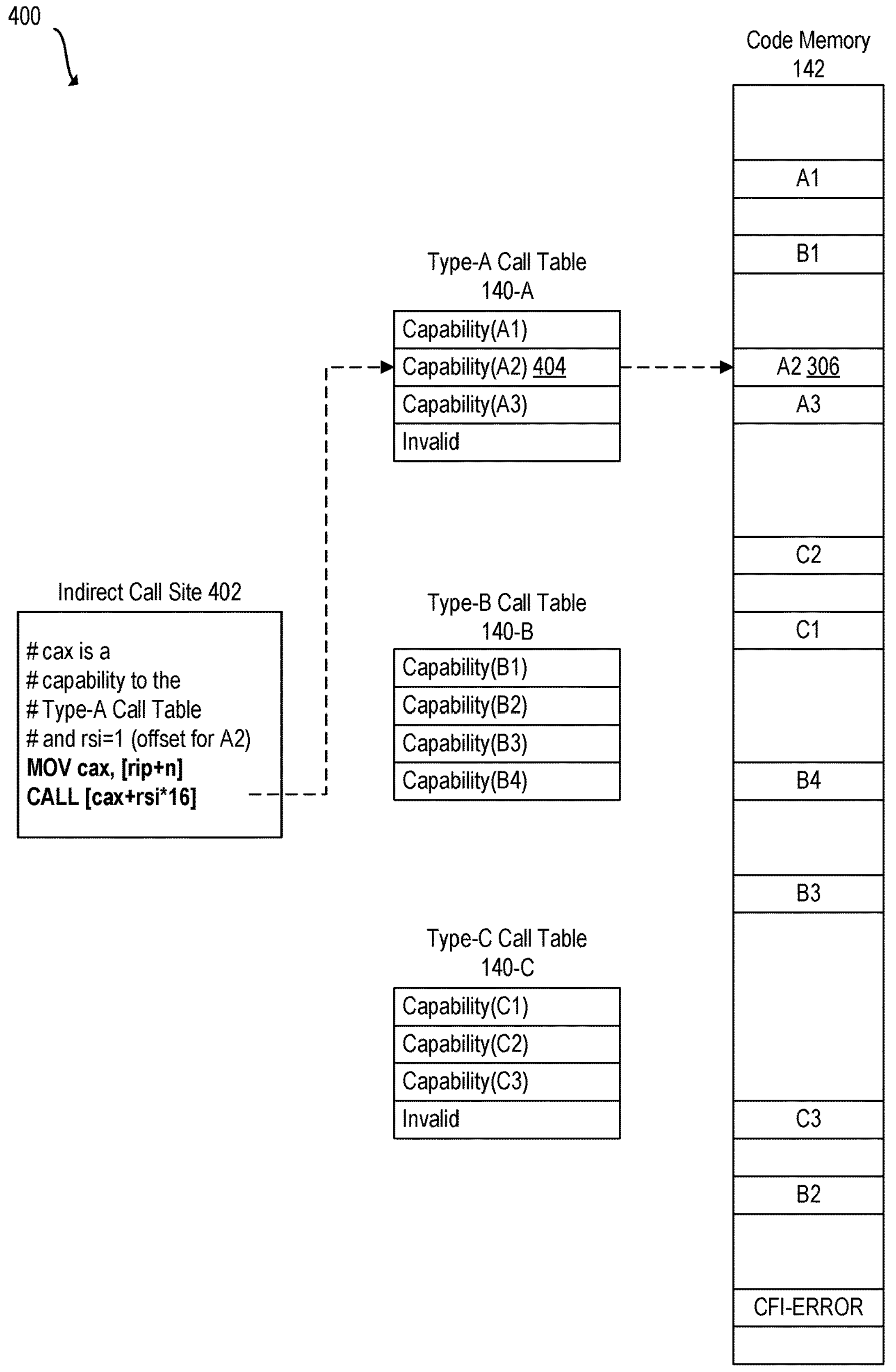
FIG. 4 illustrates a flow of an indirect function-call check (IFCC) implemented via capability instructions for a memory having a plurality of call tables of different types according to examples of the disclosure.

In certain examples, memory 134 includes (e.g., is to store) code memory 142, e.g., storing one or more executable functions (for example, where the functions are not (e.g., necessarily) stored in (e.g., logical) memory order, e.g., function B1 is stored between functions A1 and A2 in FIGS. 3 and 4). In certain examples, memory 134 includes one or more function call tables 140, e.g., where the call tables 140 are generated by the hardware processor 100 during operation. In certain examples, one or more functions of a first type are stored in a "first function type" call table of call tables 140 and one or more functions of a second type are stored in a "second function type" call table of call tables 140. In certain examples, the function "type" is according to a forward CFI (e.g., FECFI) function type.

In certain examples, software (for example, according to a programming language, e.g., a "C++ programming language" standard) allows for virtual calls to be made through objects, which are instances of a particular class, where one class (e.g., rectangle class) inherits from another class (e.g., shape class), and both classes can define the same function (e.g., draw( ) function), and declare it to be virtual. In certain examples, any class that has a virtual function is known as a polymorphic class. In certain examples, such a class has an associated virtual function table (vtable) (e.g., call table 140), which contains pointers to the code for all the virtual functions for the class. In certain examples, during execution, a pointer to an object declared to have the type of a parent class (its static type, e.g., shape) may actually point to an object of one of the child classes (its dynamic type, e.g., rectangle). In certain examples, at runtime, the object contains a pointer (e.g., the vtable (e.g., call table) pointer) to the appropriate vtable (e.g., call table) for its dynamic type. In certain examples, when code (e.g., an object) makes a call to a virtual function, the vtable pointer in the object is dereferenced to find the vtable, then the offset appropriate for the function is used to find the correct function pointer within the vtable, and that pointer is used for the actual indirect call (e.g., to the function stored in code memory 142). In certain examples, the vtables (e.g., call tables 140) themselves are placed in read-only memory, so they cannot be (e.g., easily) attacked.

In certain examples, objects making the calls are allocated on a heap. In certain examples, an attacker can make use of existing errors in the program, such as use-after-free, to overwrite the vtable pointer in the object and make it point to a vtable created by the attacker. For example, where the next time a virtual call is made through the object, it uses the attacker's vtable and executes the attacker's code.

To prevent attacks that hijack virtual calls through bogus vtables, certain examples verify the validity, at each call site, of the vtable pointer being used for the virtual call, before allowing the call to execute. In certain examples, this includes verifying that the vtable pointer about to be used is correct for the call site, e.g., that it points either to the vtable for the static type of the object, or to a vtable for one of its descendant classes. In certain examples, this is achieved by rewriting the code (e.g., compiler's Intermediate Representation (IR) code) for making the virtual call, e.g., a verification call is inserted after getting the vtable pointer value out of the object (e.g., ensuring the value cannot be attacked between its verification and its use) and before dereferencing the vtable pointer. In certain examples, the compiler passes to the verifier function the vtable pointer from the object and the set of valid vtable pointers for the call site, for example, if the pointer from the object is in the valid set, then it gets returned and used, and, otherwise, the verification function calls a failure function, e.g., which reports an error and aborts execution immediately.

In certain examples, an indirect function call uses an instruction call (e.g., instruction) with a register as an operand (e.g., argument) (e.g., register "rax" in the example in FIG. 3). In certain examples, the register is previously loaded either directly with the fixed address of the function (e.g., subroutine) that is to be called, or with a value fetched from somewhere else, such as, but not limited to, another register or a location in memory where the function's (e.g., subroutine's) address was previously stored, e.g., a call table 140 (e.g., where that address is not included in the indirect function call (e.g., instruction)). In certain examples, a direct function call (e.g., instruction) uses a fixed address as an operand (e.g., argument), e.g., after a linker has performed its job, this address will be included in the direct function call (e.g., instruction). In certain examples, a direct call (e.g., instruction calls (e.g., always calls) the same function (e.g., subroutine), whereas the indirect call (e.g., instruction) can call different functions (e.g., subroutines), e.g., depending on what was loaded in the register before the call is made.

In certain examples, under FECFI for indirect function calls, each unique function type has its own bit vector, and at each call site there is to be a check that the function pointer is a member of the function type's bit vector, e.g., where the bit vectors are of function entry points (e.g., and not of virtual tables).

However, such checks can add significant increases in processing power and/or power, e.g., for a processor that does not include CET-IBT (and thus may not implement FineIBT) and/or does not offer comprehensive CFI or memory safety solutions. Examples herein overcome these issues by utilizing circuitry and methods for implementing forward-edge control-flow integrity (FECFI) using one or more capability-based instructions. Certain examples herein utilize one or more capability instructions (e.g., an extension thereto) to enforce indirect (e.g., via capability management circuit 108) function-call checks. This is discussed further below in reference to FIGS. 3-4.

Although the capability management circuit 108 is depicted within the execution circuit 106, it should be understood that the capability management circuit can be located elsewhere, for example, in another component of hardware processor 100 (e.g., within fetch circuit 102) or separate from the depicted components of hardware processor 100.

Depicted hardware processor 100 includes a hardware fetch circuit 102 to fetch an instruction (e.g., from memory 134), e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware processor 100 includes a hardware decoder circuit 104 to decode an instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware execution circuit 106 is to execute the decoded instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134.

In certain examples, an instruction utilizes a call table 140, e.g., to perform an indirect call of a function stored in code memory 142, e.g., a function that is indirectly called via a capability to a call table 140 that stores one or more capabilities (e.g., or one or more pointers) to the respective functions stored in code memory 142. This is discussed further in reference to FIG. 4.

In certain examples, an (e.g., call) instruction utilizes (e.g., takes as an operand) a capability 112 to the address where a particular call table 140 of a particular type is stored, e.g., and an offset of an entry for that type of function that is requested for execution. As discussed further below in reference to FIG. 4, in certain examples, an instruction utilizes (e.g., takes as an operand) (i) a capability 112 (e.g., stored in register "CAX") to access the call table of that type (shown as type-A call table 140-A), and (ii) an offset to a particular function of that type (shown as an offset of "1" element for function A2) to access a second capability (e.g., or pointer) stored in the corresponding element of that call table (shown as the second element 404 of call table 140-A for function "A2"), and then that second capability (e.g., or pointer) from the call table is used to access the function stored at that corresponding section (shown as function A2 in section 306 of code memory 142).

In certain examples, execution of a (e.g., indirect) call instruction is used to (e.g., indirectly) call a function. In certain examples, a call instruction (having a mnemonic of CALL) causes the performance of multiple operations, for example, (i) a capability-based check or checks (e.g., a check of the first capability ("pointing") to a call table 140 and/or a check of the second capability ("pointing") to the indirect function in code memory 142), (ii) (optionally) pushing the return address (address immediately after the CALL instruction) on the stack, and (iii) changing the instruction pointer (IP) (e.g., extended IP) to the call destination (e.g., transfers control to the call target and beginning execution there).

In certain examples, capability management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction, is to allow access to memory 134 corresponding to that capability (e.g., only if) the capability-based check(s) pass (e.g., and if the check(s) do not pass, to not allow access (e.g., fault)) and/or (ii) if a non-capability instruction, is not to allow access to memory 134 corresponding to that capability.

In certain examples, capability management circuit 108 is to check if an instruction is a capability instruction or a non-capability instruction by checking (i) a field (e.g., opcode or instruction prefix) of the instruction (e.g., checking a corresponding bit or bits of the field that indicate if that instruction is a capability instruction or a non-capability instruction) and/or (ii) if a particular register is a "capability" type of register (e.g., instead of a general-purpose data register) (e.g., implying that certain register(s) are not to be used to store a capability or capabilities). In certain examples, capability management circuit 108 is to manage the capabilities, e.g., only the capability management circuit is to set and/or clear validity tags (e.g., in memory and/or in register(s)). In certain examples, capability management circuit 108 is to clear the validity tag of a capability in a register in response to that register being written to by a non-capability instruction. In certain examples, a capability management circuit does not permit access to another type of indirect function call table by a capability to a first type of indirect function call table, e.g., but does allow access by that capability to multiple (e.g., each) of the functions within that indirect function call table of the first type. In certain examples, a capability management circuit is to, for a call instruction that includes an operand (e.g., field) that indicates a first offset of a first entry for a first function requested for execution, and an opcode that indicates the capability management circuit is to perform a first check that the first offset is within a lower bound and an upper bound of the first capability and a second check that the first offset is a permitted offset, and in response to the first check and the second check both passing, cause an execution circuit to execute the first function.

In certain examples, (ii) the source storage identifier for a first capability to a call table 140 is a register 114 (e.g., capability register 120), and that capability register 120 and/or call table 140 are protected by the first capability and/or (ii) the source storage identifier for the function indicated by the second capability from the call table 140 (e.g., the second capability for A2 stored in call table entry element 404) and/or the corresponding "called" function in code memory 142 (e.g., function A2 stored at element 306 of code memory 142 (e.g., initial address of) that element 306)) is protected by the second capability. In certain examples, the source storage identifier of the first capability is an operand of an (e.g., supervisor level or user level) instruction (e.g., microcode or micro-instruction) (e.g., having a mnemonic of CALL) that is to access the call table to determine the address of the to-be-called function and store that address into the instruction pointer (IP) (e.g., extended IP (EIP) (e.g., 32-bits wide) and/or relative IP (RIP) (e.g., 64-bits wide) register 124. In certain examples, the instruction is requested for execution by executing user code and/or OS code 148 (e.g., or some other privileged process authorized to do so). In certain examples, an instruction set architecture (ISA) includes one or more instructions for manipulating the capability field(s) (e.g., the fields in FIGS. 2A-2B), e.g., to set the metadata and/or bound(s) of an object in memory (e.g., a call table 140).

In certain examples, capability management circuit 108 is to enforce security properties on changes to capability data (e.g., metadata), for example, for the execution of a single instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability manipulation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, capability management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a capability management circuit 108 provide the foundation on which a capability-based OS, compiler, and runtime can implement a certain programming language (e.g., C and/or C++) language memory safety and compartmentalization.

In certain examples, the capability is stored in a single line of data. In certain examples, the capability is stored in multiple lines of data. For example, a block of memory may be lines 1 and 2 of data of the (e.g., physical) addressable memory 136 of memory 134 having an address 138 to one (e.g., the first) line (e.g., line 1). Certain examples have a memory of a total size X, where X is any positive integer. Although the addressable memory 136 is shown separate from certain regions (e.g., call tables 140 and code memory 142), it should be understood that those regions (e.g., call tables 140 and code memory 142) may be within addressable memory 136.

In certain examples, capabilities (e.g., one or more fields thereof) themselves are also stored in memory 134, for example, in data structure 144 (e.g., table) for capabilities. In certain examples, a (optional, as indicated by the dotted box) (e.g., validity) tag 146 is stored in data structure 144 for a capability stored in memory. In certain examples, tags 146 (e.g., in data structure 144) are not accessible by non-capability (e.g., load and/or store) instructions. In certain examples, a (e.g., validity) tag is stored along with the capability stored in memory (e.g., in one contiguous block).

Depicted hardware processor 100 includes one or more registers 114, for example, one or any combination (e.g., all of): shadow stack pointer (e.g., capability) register(s) 116, stack pointer (e.g., capability) register(s) 118, capability register(s) 120, thread-local storage capability register(s) 122, IP (e.g., EIP/RIP) register(s) 124, general purpose (e.g., data) register(s) 126, or special purpose (e.g., data) register(s) 128. In certain examples, a user is allowed access to only a proper subset (e.g., not all) of registers 114.

In certain examples, memory 134 (optionally, as indicated by the dotted box) includes a stack 152 (e.g., and (optionally, as indicated by the dotted box) a shadow stack 154). A stack may be used to push (e.g., load data onto the stack) and/or pop (e.g., remove or pull data from the stack). In one example, a stack is a last in, first out (LIFO) data structure. As examples, a stack may be a call stack, data stack, or a call and data stack. In one example, a context for a first thread may be pushed and/or popped from a stack. For example, a context for a first thread may be pushed to a stack when switching to a second thread (e.g., and its context). Context (e.g., context data) sent to the stack may include (e.g., local) variables and/or bookkeeping data for a thread. A stack pointer (e.g., stored in a stack pointer register 118) may be incremented or decremented to point to a desired element of the stack.

In certain examples, a shadow stack 154 is used, for example, in addition to a (e.g., separate) stack 152 (e.g., as discussed herein). In one example, the term shadow stack may generally refer to a stack to store control information, e.g., information that can affect program control flow or transfer (e.g., return addresses and (e.g., non-capability) data values). In one example, a shadow stack 154 stores control information (e.g., pointer(s) or other address(es)) for a thread, for example, and a (e.g., data) stack may store other data, for example, (e.g., local) variables and/or bookkeeping data for a thread.

In certain examples, one or more shadow stacks 154 are included and used to protect an apparatus and/or method from tampering and/or increase security. The shadow stack (s) (e.g., shadow stack 154 in FIG. 1) may represent one or more additional stack type of data structures that are separate from the stack (e.g., stack 152 in FIG. 1). In one example, the shadow stack (or shadow stacks) is used to store control information but not data (e.g., not parameters and other data of the type stored on the stack, e.g., that user-level application programs are to write and/or modify). In one example, the control information stored on the shadow stack (or stacks) is return address related information (e.g., actual return address, information to validate return address, and/or other return address information). In one example, the shadow stack is used to store a copy of each return address for a thread, e.g., a return address corresponding to a thread whose context or other data has been previously pushed on the (e.g., data) stack. For example, when functions or procedures have been called, a copy of a return address for the caller may have been pushed onto the shadow stack. The return information may be a shadow stack pointer (SSP), e.g., that identifies the most recent element (e.g., top) of the shadow stack. In certain examples, the shadow stack may be read and/or written to in user level mode (for example, current privilege level (CPL) equal to three, e.g., a lowest level of privilege) or in a supervisor privilege level mode (for example, a current privilege level (CPL) less than three, e.g., a higher level of privilege than CPL=3). In one example, multiple shadow stacks may be included, but only one shadow stack (e.g., per logical processor) at a time may be allowed to be the current shadow stack. In certain examples, there is a (e.g., one) register of the processor to store the (e.g., current) shadow stack pointer.

In certain examples, the shadow stack (e.g., capability) register 116 stores a capability (e.g., a pointer with security metadata) that indicates the (e.g., address of the) corresponding element in (e.g., the top of) the shadow stack 154 in memory 134. In certain examples, the stack register 118 stores a capability (e.g., a pointer with security metadata) that indicates the (e.g., address of the) corresponding element in (e.g., the top of) the stack 152 in memory 134.

In certain examples, register(s) 114 includes capability register(s) 120 dedicated only for capabilities, e.g., registers CAX, CBX, CCX, CDX, etc.). In certain examples, the capability register(s) 120 stores a capability (e.g., a pointer with security metadata) that indicates the (e.g., address of the) corresponding data in memory 134 (e.g., data that is protected by the capability).

In certain examples, the thread-local storage capability register(s) 122 stores a capability (e.g., a pointer with security metadata) that indicates the (e.g., address of the) corresponding thread-local storage in memory 134 (e.g., thread-local storage that is protected by the capability). In certain examples, thread-local storage (TLS) is a mechanism by which variables are allocated such that there is one instance of the variable per extant thread, e.g., using static or global memory local to a thread.

In certain examples, the IP register(s) 124 stores a value that indicates the (e.g., address of) the next instruction to be executed by the processor. In certain examples, this increments to the next instruction (e.g., in program order) unless modified by a control flow instruction, e.g., CALL as discussed herein.

In certain examples, the general purpose (e.g., data) register(s) 126 are to store values (e.g., data). In certain examples, the general purpose (e.g., data) register(s) 126 are not protected by a capability (e.g., but they can be used to store a capability). In certain examples, general purpose (e.g., data) register(s) 126 (e.g., 64-bits wide) includes registers RAX, RBX, RCX, RDX, RBP, RSI, RDI, RSP, and R8 through R15.

In certain examples, the special purpose (e.g., data) register(s) 128 are to store values (e.g., data). In certain examples, the special purpose (e.g., data) register(s) 128 are not protected by a capability (e.g., but they may in some examples be used to store a capability). In certain examples, special purpose (e.g., data) register(s) 128 include one or any combination of floating-point data registers (e.g., to store floating-point formatted data), vector (e.g., Advanced Vector eXtension (AVX)) registers, two-dimensional matrix (e.g., Advanced Matrix eXtension (AMX)) registers, etc.

Hardware processor 100 includes a coupling (e.g., connection) to memory 134. In certain examples, memory 134 is a memory local to the hardware processor (e.g., system memory). In certain examples, memory 134 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Hardware processor 100 includes a memory management circuit 130, for example, to control access (e.g., by the execution unit 106) to the (e.g., addressable memory 136 of) memory 134. Hardware processor 100 (e.g., memory management circuit 130) may include an (optional, as indicated by the dotted box) encryption/decryption circuit 132, for example, to encrypt or decrypt data for memory 134.

Memory 134 may (optionally, as indicated by the dotted box) include virtual machine monitor code 150. In certain examples of computing, a virtual machine (VM) is an emulation of a computer system. In certain examples, VMs are based on a specific computer architecture and provide the functionality of an underlying physical computer system. Their implementations may involve specialized hardware, firmware, software, or a combination. In certain examples, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (I/O) resources, such as, but not limited to, memory management circuit 130. The VMM may provide a centralized interface for managing the entire operation, status, and availability of VMs that are installed over a single host machine or spread across different and interconnected hosts.

Certain instructions herein implement a capability check by capability management circuit 108 in the loading of a corresponding address for an indirect function call of an indirect function call table, e.g., of a forward-edge control-flow integrity (FECFI) function type of a plurality of different types.

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory (e.g., in tags 146) by the architecture (e.g., by capability management circuit 108). In certain examples, each element of the capability contributes to the protection model and is enforced by hardware (e.g., capability management circuit 108).

In certain examples, when stored in memory, valid capabilities are to be naturally aligned (e.g., at 64-bit or 128-bit boundaries) depending on capability size where that is the granularity at which in-memory tags are maintained. In certain examples, partial or complete overwrites with data, rather than a complete overwrite with a valid capability, lead to the in-memory tag being cleared, preventing corrupted capabilities from later being dereferenced. In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

Figure 2A:
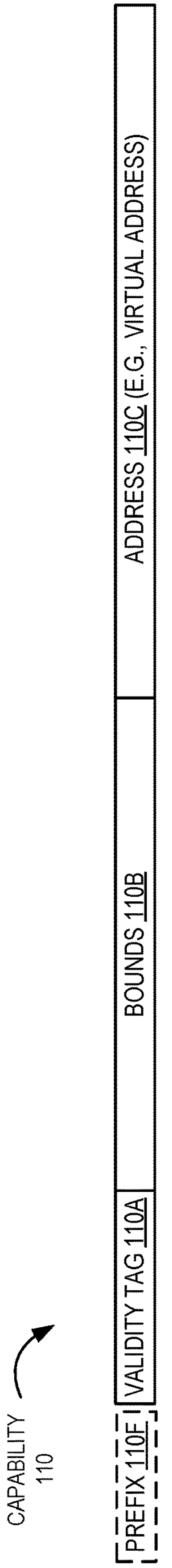
FIG. 2A illustrates an example format of a capability including a validity tag field, a bounds field, and an address field according to examples of the disclosure.
Figure 2B:
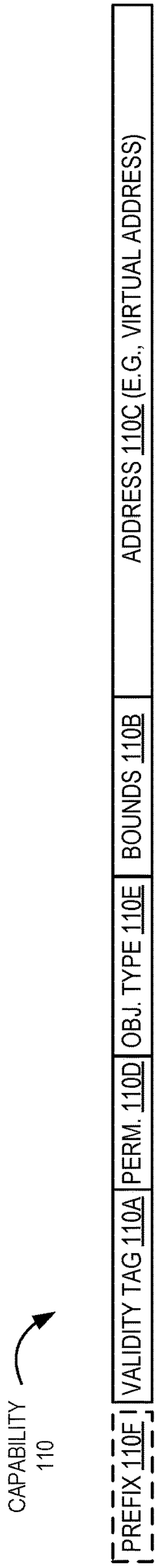
FIG. 2B illustrates an example format of a capability including a validity tag field, a permission field, an object type field, a bounds field, and an address field according to examples of the disclosure.

FIG. 2A illustrates an example format of a capability 110 including a validity tag 110A field, a bounds 110B field, and an address 110C (e.g., virtual address) field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for example, for memory access), and/or the address 110C is the memory address storing the corresponding data (or instructions) protected by the capability.

In certain examples, the capability 110 stores one or more capability protection values to implement forward-edge control-flow integrity (FECFI) function type checking via the capability, for example, to differentiate a function call table is allowed to be accessed by that capability (e.g., and to be accessed only at a permitted offset), e.g., and that other function call tables are not to be accessed (e.g., and are not to be accessed at a non-permitted offset).

In certain examples, a prefix 110F of the capability 110 is included, e.g., to store one or more capability protection values to implement forward-edge control-flow integrity (FECFI) function type checking via the capability, for example, to differentiate a function call table is allowed to be accessed by that capability (e.g., and to be accessed only at a permitted offset), e.g., and that other function call tables are not to be accessed (e.g., and are not to be accessed at a non-permitted offset).

FIG. 2B illustrates an example format of a capability 110 including a validity tag 110A field, a permission(s) 110D field, an object type 110E field, a bounds 110B field, and an address 110C field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space (e.g., the range) to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization.

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

In certain examples, a capability is an individually revocable capability (IRC). In certain examples, each address space has capability tables for storing a capability associated with each memory allocation, and each pointer to that allocation contains a field (e.g., table index) referencing the corresponding table entry (e.g., a tag in that entry). In certain embodiments, IRC deterministically mitigates spatial vulnerabilities.

In certain examples, the format of a capability (for example, as a pointer that has been extended with security metadata, e.g., bounds, permissions, and/or type information) overflows the available bits in a pointer (e.g., 64-bit) format. In certain examples, to support storing capabilities in a general-purpose register file without expanding the registers, examples herein logically combine multiple registers (e.g., four for a 256-bit capability) so that the capability can be split across those multiple underlying registers, e.g., such that general purpose registers of a narrower size can be utilized with the wider format of a capability as compared to a (e.g., narrower sized) pointer.

In certain examples, the capability 110 stores one or more capability protection values to implement forward-edge control-flow integrity (FECFI) function type checking via the capability, for example, to differentiate a function call table is allowed to be accessed by that capability (e.g., and to be accessed only at a permitted offset), e.g., and that other function call tables are not to be accessed (e.g., and are not to be accessed at a non-permitted offset).

In certain examples, a prefix 110F of the capability 110 is included, e.g., to store one or more capability protection values to implement forward-edge control-flow integrity (FECFI) function type checking via the capability, for example, to differentiate a function call table is allowed to be accessed by that capability (e.g., and to be accessed only at a permitted offset), e.g., and that other function call tables are not to be accessed (e.g., and are not to be accessed at a non-permitted offset). Additionally or alternatively, in certain examples, object type 110E of the capability 110 is included, e.g., to store one or more capability protection values to implement forward-edge control-flow integrity (FECFI) function type checking via the capability, for example, to differentiate a function call table is allowed to be accessed by that capability (e.g., and to be accessed only at a permitted offset), e.g., and that other function call tables are not to be accessed (e.g., and are not to be accessed at a non-permitted offset). In certain examples, the object type 110E is not used to store one or more capability protection values to implement forward-edge control-flow integrity (FECFI) function type checking, e.g., is not used to identify a particular indirect function call type of a plurality of indirect function call types.

In certain examples, one or more fields of a capability 110 are used to implement forward-edge control-flow integrity (FECFI) function type checking, e.g., to identify a particular indirect function call type of a plurality of indirect function call types (e.g., to perform an indirect function-call check (IFCC)).

FIG. 3 illustrates a flow 300 of an indirect function-call check (IFCC) via non-capability instructions for a memory having a plurality of call tables of different types according to examples of the disclosure. Indirect call site 302 (e.g., as a section of instruction to be executed) includes a request to perform an indirect memory call to function A2 at element 306 of code memory 142. However, as discussed earlier, in certain examples, the actual location of the function A2 may not be known (e.g., at compile time) and thus flow 300 is to perform an AND operation (e.g., instruction) to mask the value at register RAX (e.g., to only return the value of the offset of the desired function (e.g., shown as offset of "1" element for function A2), perform an ADD operation (e.g., instruction) on the masked value (e.g., 1 memory element) to the base pointer value of call table A 140-A to determine the location in call table 140-A of the call table entry 304 for the jump to function A2, and then perform a jump to that resultant, e.g., to switch the instruction pointer to point to the function A2 that is stored (e.g., beginning) at location 306.

FIG. 4 illustrates a flow 400 of an indirect function-call check (IFCC) implemented via capability instructions for a memory having a plurality of call tables of different types according to examples of the disclosure. Indirect call site 402 (e.g., as a section of instruction to be executed) includes a request to perform an indirect memory call to function A2 at element 306 of code memory 142. However, flow 400 utilizes capabilities to implement forward-edge control-flow integrity (FECFI) function type checking, e.g., to identify a particular indirect function call type of a plurality of indirect function call types (e.g., to perform an indirect function-call check (IFCC)). In certain examples, the CALL instruction of indirect call site 402 is a capability-based instruction, e.g., where the capability register CAX stores the capability that points to (and protects) the request to perform an indirect memory call to function A2 at element 306 of code memory 142. In certain examples, the flow 400 includes a move (MOV) operation (e.g., instruction) that is to move the capability (e.g., at RIP+n, loaded from the heap, thread-local storage, or another location) for the capability table to-be-accessed (shown as type-A call table 140-A) into capability register CAX, and then perform a CALL operation (e.g., instruction) that performs the associated checks with that capability stored in CAX to implement forward-edge control-flow integrity (FECFI) function type checking, e.g., to identify a particular indirect function call type of a plurality of indirect function call types (e.g., to perform an indirect function-call check (IFCC)) via the capability. In certain examples, the capability (e.g., stored in CAX) causes the execution (e.g., by capability management circuit 108) of the one or more checks that are indicated by the CALL instruction, for example, where the CALL instruction includes an opcode to indicate the capability management circuit is to perform a first check that the requested offset (e.g., "1" in FIG. 4) is within a lower bound and an upper bound of the first capability from CAX and a second check that the first offset is a permitted offset (e.g., as also indicated by a field of the first capability), e.g., and in response to the first check and the second check both passing, cause an execution circuit to execute the CALL instruction (e.g., to load the IP (e.g., starting address) for the A2 function that is stored at 306 into the IP register 124. In certain examples, the permitted offset is stored in one or more of the fields shown in FIG. 2A or 2B, e.g., or as an additional prefix field 110F to the formats shown in FIGS. 2A and 2B. In certain examples, even if the CALL instruction for the capability from CAX is authorized to access each entry in a particular table, e.g., each of the capability entries in type-A call table 140-A that protect code functions A1, A2, and A3, respectively, it faults if the requested offset (for example, shown as integers multiplied by 16-bytes or 128-bits, e.g., where permitted offsets are 128-bit granularity) is not the permitted offset (e.g., one of the permitted offsets). Thus, in certain examples herein, capabilities implement forward-edge control-flow integrity (FECFI) function type checking, e.g., to identify a particular indirect function call type of a plurality of indirect function call types (e.g., to perform an indirect function-call check (IFCC)) via the capability.

In certain examples, capabilities can be used to enforce IFCC for an indirect call site that should only be allowed to call a function of type A. In certain examples, the indirect function call (CALL) is preceded by a move (MOV) instruction that loads a capability to the Type-A Call Table 140-A into the CAX register (e.g., where CAX is a capability extension to the x86 RAX register that allows CAX to hold a capability). In certain examples, the source memory operand [rip+n] refers to a location in read-only program memory 142 that holds the Type-A Call Table capability. Referring again to FIG. 4, in certain examples, this capability has a base pointer that refers to the first entry in the Type-A Call Table (Capability(A1)) and the bounds encompass all four entries in the table, e.g., including the Invalid entry. In certain examples, the permissions (perms) of the Type-A Call Table capability (e.g., must) include at least the read permission (if code capabilities are stored in the call table) or the execute permission (if jump (JMP) instructions are stored in the call table). In certain examples, capabilities can specify object types (e.g., in an "otype" field, see, e.g., FIG. 2B). In certain examples, a particular otype value is defined for call tables, e.g., to enforce that the call table is only accessed at authorized offsets, e.g., at an offset evenly divisible by the size of a function pointer or a jump instruction depending on whether function pointers or jump instructions are contained in the call table. In certain examples, this can eliminate the need for a tag bit for individual entries within the call table, although it may still be useful to be able to distinguish between valid and invalid call table entries. For example, a reserved value such as zero could indicate that a call table entry is empty.

In certain examples, the call instruction invokes the Type-A Call Table capability in CAX with the index provided in register RSI scaled by the size of a capability (for example, 16 bytes) to compute the offset. In certain examples, the scaling could also be applied to the offset register with a separate multiplication operation before the call instruction. In certain examples, if the offset exceeds the bounds imposed by the Type-A Call Table capability, the processor (e.g., capability management circuit) signals an error, e.g., a fault. In certain examples, if the offset is not aligned to the size of a capability, this will also cause the CALL instruction to fault (either because the call checks for alignment when reading a capability from memory, or because the unaligned read will not yield a capability with a valid tag bit). In certain examples, if the capability checks pass, then the call invocation loads Capability (A2) (that indicated function A2 at element 306) from 404 into the IP register 124 (e.g., program counter capability (PCC)), thus redirecting the program's control flow to A2, subject to any additional constraints (bounds, permissions, etc.) imposed by Capability(A2). Some implementations also allow the CALL instruction to update the program's (e.g., data) capability. Alternatively, the call instruction may invoke a direct jump (jmp) instruction in the call table that will in turn jump to the destination function.

In certain examples, a compiler (or linker) allocates the type-based call tables in read-only memory to prevent them from being unintentionally or maliciously overwritten. Thus, the examples in FIG. 4 can use capabilities to achieve the same IFCC property as the flow shown in FIG. 3. One advantage of the examples in FIG. 4 is that they allow the program to constrain the scope of execution (e.g., and the scope of accessible data) during the type-checked indirect call invocation. This can, for example, allow one isolated subprocess to make a type-safe call into another isolated subprocess with a single operation.

In certain examples, it is preferred not to make two capability loads for an indirect function call, e.g., a first load to obtain the Type-A Call Table capability, and then a second load to obtain the capability to A2. An alternative example uses masking instructions instead of the first load to obtain the Type-A Call Table capability. For example, the indirect call site 402 could be instrumented with the following code:

```
# rax is the offset of Capability(A2) in the Type-A Call Table
  AND rax, maskA
  ADD rax, baseptrA
  CALL [rax]
```

This example establishes security commensurate with that shown in FIG. 4, but without the need for the first capability load (MOV in FIG. 4). However, this does utilize more instructions and a potentially large (for example, 8 bytes) immediate operand to add the base pointer for Type-A call table 140-A baseptrA (the immediate operand) to RAX. In this example, the call invocation loads Capability(A2) (that indicated function A2 at element 306) from storage element 404 into the IP register 124 (e.g., program counter capability (PCC)), thus redirecting the program's control flow to A2, subject to any additional constraints (e.g., bounds, permissions, etc.) imposed by Capability (A2). Some implementations also allow the CALL instruction to update the program's (e.g., data) capability.

Some instruction set architectures may lack support for 8-byte immediate operands for operations (such as ADD), which may additionally use an instruction that can load an 8-byte immediate operand into a register to be added to the offset.

In certain examples, the capability (e.g., from CAX) in indirect call site 402 allows access to Type-A call table 140-A, e.g., but not access to Type-B call table 140-B and not access to Type-C call table 140-C. In certain examples, the permitted offset for a call table is indicated by the capability that protects that call table (e.g., indicated by a field of the first capability that is separate from the bounds field(s)), e.g., where in one example each call table has the same permitted offset and another example where a first call table has a different permitted offset than a permitted offset of a second call table.

Certain examples herein are directed to capability instructions that improve the ability of a capability architecture to enable ABIs that enforce indirect function-call checks. In certain examples, capability instructions are augmented with conditional or predicate semantics to form predicated capability instructions (PCIs). New PCI variants of call and jump instructions can be used to implement IFCC by predicating the indirect call on the outcome of a bounds check. For example, the indirect call site can be instrumented with the following code:

```
# rax is the offset of Capability(A2) in the Type-A Call Table
  CMP rax, boundsA
  ADD rax, baseptrA, nf
  CALLL [rax]
```

where CMP compares RAX value to boundsA (e.g., the RAX value subtracted from the boundsA value and sets the status flags in a (e.g., flag) register 114 according to the results), boundsA is either the number of entries in the Type-A Call Table, or the number of bytes, and the no-flags (nf) indication (e.g., bit) on the add instruction prevents the instruction from affecting the flags register (e.g., EFLAGS/RFLAGS on x86). In certain examples, the call if less (CALLL) instruction can fail (for example, by triggering a fault) if its condition code L (less than) is not satisfied by the result of the CMP instruction (e.g., the "call" will be allowed if the result of the CMP instruction satisfies the condition code "L").

Certain examples herein can have the form of a single branch instruction with the bounds of the target jump table encoded as immediate operands. For example:

JMP rsi, base, size where base is the base of the jump table (e.g., encoded as an absolute address, or a RIP-relative address), size is the size of the jump table (e.g., encoded as the size of the table in bytes, or the number of entries), and RSI is a register that points to the entry in the table to which the processor (e.g., central processing unit (CPU) will branch (e.g., represented either as an offset in bytes, or the index of the desired entry). In certain examples, if the register operand (RSI) exceeds the bounds specified in the immediate operands (e.g., base, size) then the instruction can trigger an error, such as a fault.

Certain examples herein are directed to forward branch instruction variants with embedded capabilities (e.g., metadata). One fundamental property of capabilities that enables them to enforce security policies is that capabilities are shielded from tampering and forgery, e.g., using a tag bit. However, certain code regions may already be shielded from tampering using page-granular permissions (e.g., in a paged memory), e.g., being marked non-writable whenever they are marked as executable and vice-versa (e.g., W^X). This, in conjunction with at least coarse-grained CFI, makes code regions suitable for storing embedded capabilities without requiring a tag bit in certain examples, e.g., as long as the entity initializing the code regions is trusted to create capabilities. In certain examples, the bounds and other capability (e.g., metadata) for a code region may be encoded into branch instructions and used to bound indirect branch targets and optionally to update the default code capability register to bound subsequent branches.

In certain examples, a challenge with embedding capabilities in instructions is fitting the instruction length constraints of various ISAs. For example, certain (e.g., certain x86) instructions are limited to 15 bytes of width, which is insufficient to store a pair of full 64-bit bounds. An alternative is to store only the least-significant 32 bits of each of the lower and upper bounds and splice the most-significant 32 bits from the IP (e.g., RIP) with those when updating the (e.g., default code) capability register. Another alternative, which may be preferred for compatibility with Position-Independent Code (PIC), is to specify the lower and upper bounds as relative displacements from the current RIP. For example, an instruction variant encoding that is selectable between various instruction displacement widths (e.g., 1 byte, 2 bytes, or 4 bytes) can select identical bound displacement widths (e.g., and use those "extra" bytes that were before not used to store the capability fields (e.g., in addition to the address field)).

At least some examples of the disclosed technologies can be described in view of the following examples.

In certain examples, an apparatus includes a capability management circuit to check a capability for a memory access request for a memory, the capability comprising an address field and a bounds field that is to indicate a lower bound and an upper bound of an address space to which the capability authorizes access; a decoder circuit to decode a single instruction into a decoded single instruction, the single instruction comprising: a first capability to indicate a first call table (e.g., according to a forward-edge control-flow integrity (FECFI) technique and/or standard) comprising a respective entry for each of a plurality of functions of a first type (e.g., a type according to a forward-edge control-flow integrity (FECFI) technique and/or standard), and a permitted offset for the entries (e.g., according to a forward-edge control-flow integrity (FECFI) technique and/or standard) in the first call table, a field to indicate a first offset of a first entry for a first function requested for execution, and an opcode to indicate the capability management circuit is to perform a first check that the first offset is within a lower bound and an upper bound of the first capability and a second check that the first offset is the permitted offset, and in response to the first check and the second check both passing, cause an execution circuit to execute the first function; and the execution circuit to execute the decoded single instruction according to the opcode. In certain examples, the execution circuit is to, in response to the second check indicating that the first offset is not the permitted offset, cause the single instruction to fault. In certain examples, the execution circuit is to, in response to the first check indicating that the first offset is beyond the lower bound or the upper bound of the first capability, cause the single instruction to fault. In certain examples, the execution circuit is to, in response to a third check indicating that a validity tag of the first capability is not set, cause the single instruction to fault. In certain examples, an object type field of the first capability is to indicate the first capability is for a call table type of object. In certain examples, a prefix of the first capability is to indicate the first capability is for a call table type of object. In certain examples, the first entry in the first call table comprises a second capability for the first function in the memory, and the opcode is to indicate that the execution circuit is to cause the capability management circuit to perform a third check that the first function is authorized by the second capability for execution, and in response to the first check, the second check, and the third check all passing, cause the execution circuit to execute the first function.

In certain examples, a method includes checking, by a capability management circuit of a processor, a capability for a memory access request for a memory, the capability comprising an address field and a bounds field that is to indicate a lower bound and an upper bound of an address space to which the capability authorizes access; decoding, by a decoder circuit of the processor, a single instruction into a decoded single instruction, the single instruction comprising: a first capability to indicate a first call table comprising a respective entry for each of a plurality of functions of a first type, a field to indicate a first offset of a first entry for a first function requested for execution, and an opcode to indicate the capability management circuit is to perform a first check that the first offset is within a lower bound and an upper bound of the first capability and a second check that the first offset is a permitted offset for the entries in the first call table, and in response to the first check and the second check both passing, cause an execution circuit to execute the first function; and executing, by the execution circuit, the decoded single instruction according to the opcode. In certain examples, in response to the second check indicating that the first offset is not the permitted offset, the executing causes the single instruction to fault. In certain examples, in response to the first check indicating that the first offset is beyond the lower bound or the upper bound of the first capability, the executing causes the single instruction to fault. In certain examples, in response to a third check indicating that a validity tag of the first capability is not set, the executing causes the single instruction to fault. In certain examples, an object type field of the first capability is to indicate the first capability is for a call table type of object. In certain examples, a prefix of the first capability is to indicate the first capability is for a call table type of object. In certain examples, the first entry in the first call table comprises a second capability for the first function in the memory, and the opcode is to indicate that the capability management circuit is to perform a third check that the first function is authorized by the second capability for execution, and in response to the first check, the second check, and the third check all passing, cause the execution circuit to execute the first function.

In certain examples, a non-transitory machine-readable medium that stores code that when executed by a machine causes the machine to perform a method including checking, by a capability management circuit of a processor, a capability for a memory access request for a memory, the capability comprising an address field and a bounds field that is to indicate a lower bound and an upper bound of an address space to which the capability authorizes access; decoding, by a decoder circuit of the processor, a single instruction into a decoded single instruction, the single instruction comprising: a first capability to indicate a first call table comprising a respective entry for each of a plurality of functions of a first type, a field to indicate a first offset of a first entry for a first function requested for execution, and an opcode to indicate the capability management circuit is to perform a first check that the first offset is within a lower bound and an upper bound of the first capability and a second check that the first offset is a permitted offset for the entries in the first call table, and in response to the first check and the second check both passing, cause an execution circuit to execute the first function; and executing, by the execution circuit, the decoded single instruction according to the opcode. In certain examples, in response to the second check indicating that the first offset is not the permitted offset, the executing causes the single instruction to fault. In certain examples, in response to the first check indicating that the first offset is beyond the lower bound or the upper bound of the first capability, the executing causes the single instruction to fault. In certain examples, an object type field of the first capability is to indicate the first capability is for a call table type of object. In certain examples, a prefix of the first capability is to indicate the first capability is for a call table type of object. In certain examples, the first entry in the first call table comprises a second capability for the first function in the memory, and the opcode is to indicate that the capability management circuit is to perform a third check that the first function is authorized by the second capability for execution, and in response to the first check, the second check, and the third check all passing, cause the execution circuit to execute the first function.

Exemplary architectures, systems, etc. that the above may be used in are detailed below. Exemplary instruction formats for capability instructions are detailed below.

Figure 5:
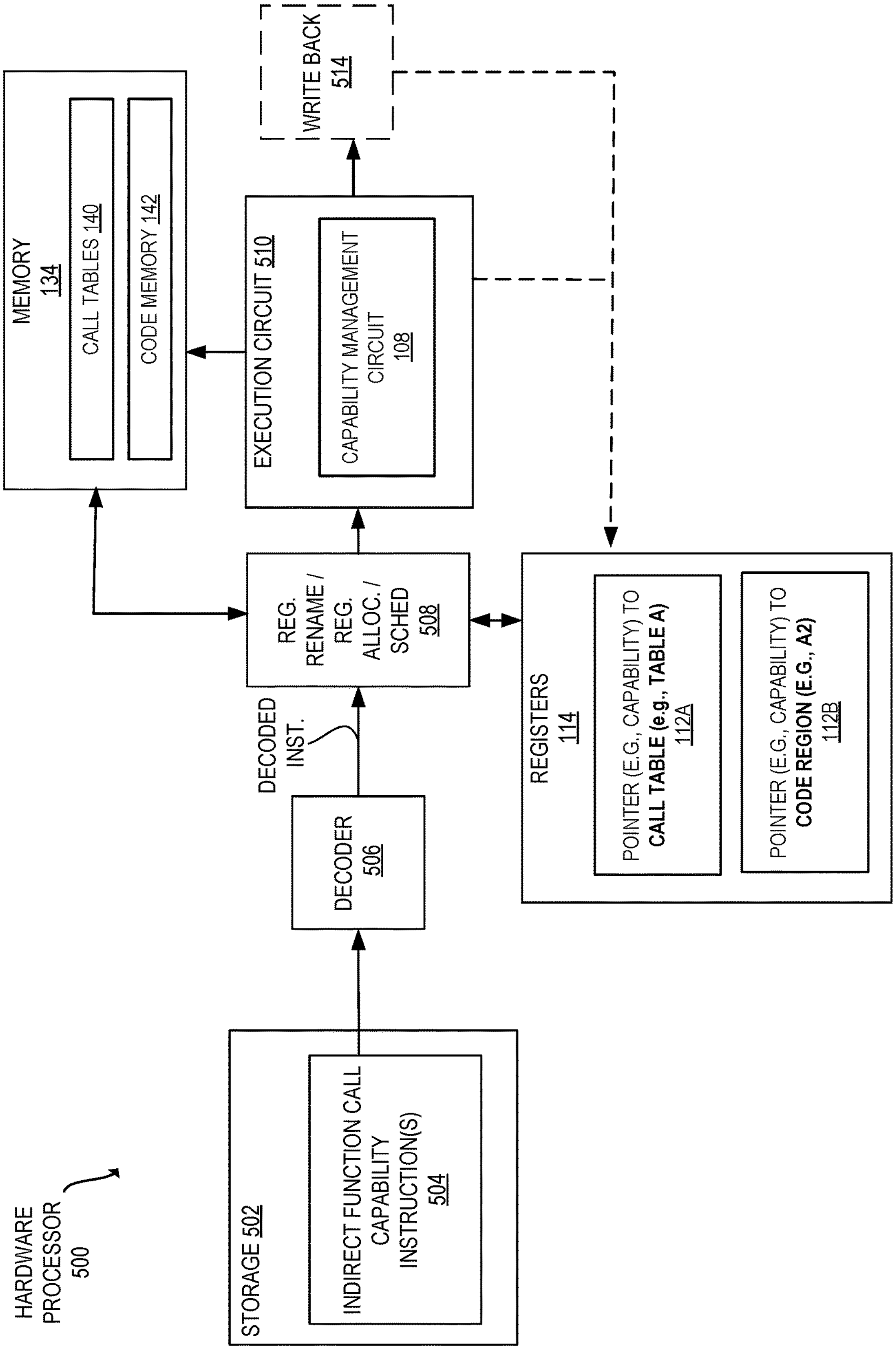
FIG. 5 illustrates examples of computing hardware to process a CALL (e.g., INDIRECT FUNCTION CALL CAPABILITY) instruction.

FIG. 5 illustrates examples of computing hardware to process a CALL (e.g., INDIRECT FUNCTION CALL CAPABILITY) instruction. The instruction may be a control flow instruction, such as CALL (e.g., INDIRECT FUNCTION CALL CAPABILITY) instruction. As illustrated, storage 502 stores a CALL (e.g., INDIRECT FUNCTION CALL CAPABILITY) instruction 504 to be executed.

The instruction 504 is received by decoder circuitry 506. For example, the decoder circuitry 506 receives this instruction from fetch circuitry (not shown). The instruction may be in any suitable format, such as that described with reference to FIG. 13 below. In an example, the instruction includes fields for an opcode, a capability (e.g., capability 112A that includes an address for a call table), an offset (e.g., as a separate field or as part of the capability), a permitted offset (e.g., as a separate field or preselected for a processor), and a destination identifier. In some examples, the sources and destination are registers, and in other examples one or more are memory locations. In some examples, one or more of the sources may be an immediate operand. In some examples, the opcode of an instruction details the capability checks that are to be performed, e.g., a first check that an offset (for a function that is to-be-called) within a call table is within a lower bound and an upper bound indicated by the capability and a second check that the offset is a permitted offset for the entries in the call table, e.g., the permitted offset indicated by the instruction. In certain examples, the capability indicates that the instruction is to access a call table (e.g., one of call tables 140), for example, by a set value indicating a "call table" type (e.g., in contrast to another type), e.g., an object type field (e.g., object type field 110E in FIG. 2B) of the first capability is to indicate the first capability is for a call table type of object and/or a prefix (e.g., prefix field 110F in FIG. 2A or 2B) of the first capability is to indicate the first capability is for a call table type of object. In certain examples, multiple fields are used to indicate the capability is for a call table type of object, e.g., and if they do not match to fault and/or if they do match, to continue with the discussed check(s). In certain examples, a call table type indicates that call table entry alignment rules are to be followed, e.g., the call table type is indicative of the permitted offset to be checked. In certain examples, the call table type is to differentiate from other types of stored information, e.g., "data" (e.g., operands to be operated on) type of stored information and/or "pointer" type of stored information.

More detailed examples of at least one instruction format for the instruction will be detailed later. The decoder circuitry 506 decodes the instruction into one or more operations. In some examples, this decoding includes generating a plurality of micro-operations to be performed by execution circuitry (such as execution circuitry 510). The decoder circuitry 506 also decodes instruction prefixes.

In some examples, register renaming, register allocation, and/or scheduling circuitry 508 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 508 store data as operands of the instruction to be operated by execution circuitry 510. Example register types include packed data registers, general purpose registers (GPRs), and floating-point registers.

Execution circuitry 510 executes the decoded instruction. Example detailed execution circuitry includes execution circuit 106 shown in FIG. 1, and execution cluster(s) 1060 shown in FIG. 10B, etc. In certain examples, the execution of the decoded instruction causes the execution circuitry to perform a first check that a requested offset (e.g., from RSI register in FIG. 4) into a call table 140 is within a lower bound and an upper bound of the first capability and a second check that the first offset is a permitted offset for the entries in the call table 140, e.g., and in response to the first check and the second check both passing, cause the execution circuit 510 to execute the first function (e.g., from code memory 142).

In some examples, retirement/write back circuitry 514 architecturally commits the destination register into the registers or memory 508 and retires the instruction.

An example of a format for a CALL (e.g., INDIRECT FUNCTION CALL CAPABILITY) instruction is OPCODE SRC, SRC2. In some examples, OPCODE is the opcode mnemonic of the instruction. In certain examples, the (e.g., implicit) destination is the IP register. In certain examples, the SRC is one or more registers, e.g., register CAX for a capability and register RSI for a requested offset. In certain examples, the operations include adding the contents of RAX and the result of a multiplication of the requested offset and the element granularity of the call table (e.g., 16 Bytes) to generate the requested address location of the capability (e.g., capability A2 at element 404 in table 140-A in FIG. 4). In certain examples, the operations include changing the instruction pointer (IP) to the function that is indicated in the indirect call table, e.g., the capability 112A is used to access the call table 140, and the pointer (or capability) 112B that is stored in the call table 140 for the code region (e.g., function) that is to be executed, is then used to change the IP to that code region (e.g., function) that is to be executed.

Figure 6:
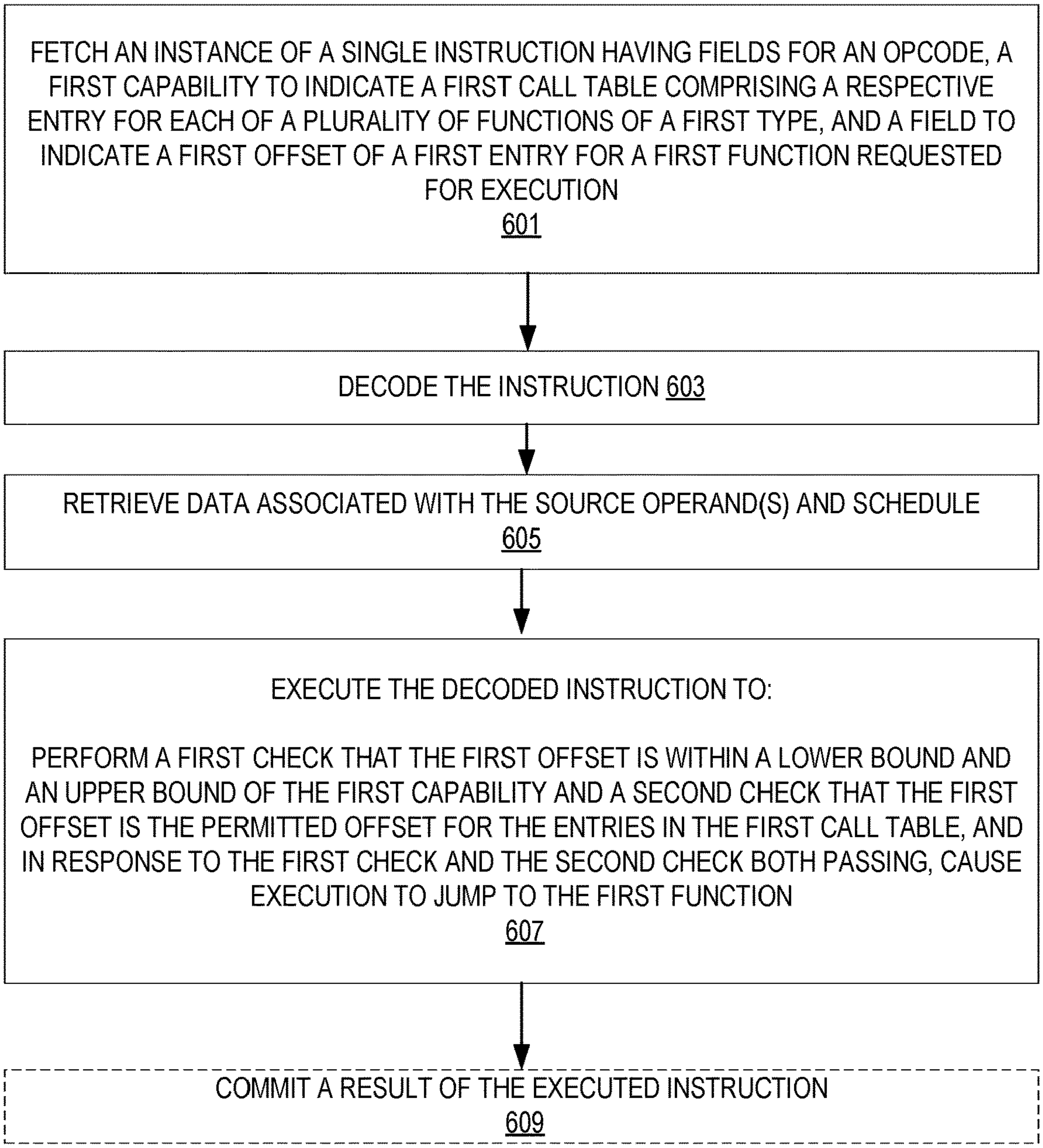
FIG. 6 illustrates an example method performed by a processor to process a CALL (e.g., INDIRECT FUNCTION CALL CAPABILITY) instruction.

FIG. 6 illustrates an example method performed by a processor to process a CALL (e.g., INDIRECT FUNCTION CALL CAPABILITY) instruction. For example, a processor core as shown in FIG. 10B, a pipeline as detailed below, etc., performs this method.

At 601, an instance of single instruction is fetched. For example, a CALL (e.g., INDIRECT FUNCTION CALL CAPABILITY) instruction is fetched. The instruction includes fields as discussed herein. In some examples, the instruction further includes a field for a writemask. In some examples, the instruction is fetched from an instruction cache. In certain examples, the opcode indicates the operations to perform, e.g., including capability checks.

The fetched instruction is decoded at 603. For example, the fetched CALL (e.g., INDIRECT FUNCTION CALL CAPABILITY) instruction is decoded by decoder circuitry such as decoder circuitry 506 or decode circuitry 1040 detailed herein.

Data values associated with the source operands of the decoded instruction are retrieved when the decoded instruction is scheduled at 605. For example, when one or more of the source operands are memory operands, the data from the indicated memory location is retrieved.

At 607, the decoded instruction is executed by execution circuitry (hardware) such as execution circuit 106 shown in FIG. 1, execution circuitry 510 shown in FIG. 5, or execution cluster(s) 1060 shown in FIG. 10B. For the CALL (e.g., INDIRECT FUNCTION CALL CAPABILITY) instruction, in certain examples, the execution will cause execution circuitry to perform the operations described herein.

In some examples, the instruction is committed or retired at 609.

Figure 7:
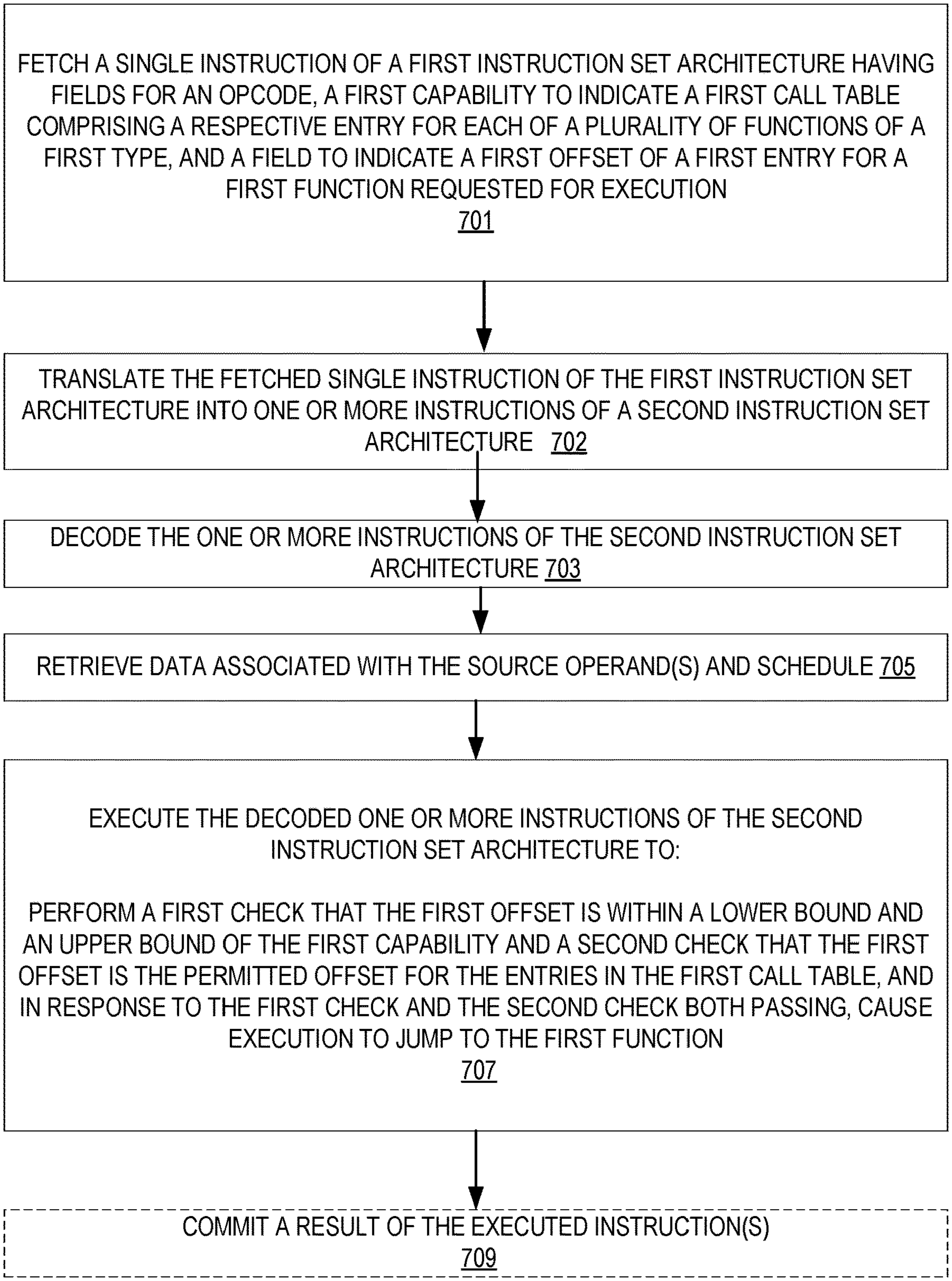
FIG. 7 illustrates an example method to process a CALL (e.g., INDIRECT FUNCTION CALL CAPABILITY) instruction using emulation or binary translation.

FIG. 7 illustrates an example method to process a CALL (e.g., INDIRECT FUNCTION CALL CAPABILITY) instruction using emulation or binary translation. For example, a processor core as shown in FIG. 10B, a pipeline and/or emulation/translation layer perform aspects of this method.

An instance of a single instruction of a first instruction set architecture is fetched at 701. The instance of the single instruction of the first instruction set architecture includes fields as discussed herein. In some examples, the instruction further includes a field for a writemask. In some examples, the instruction is fetched from an instruction cache.

Figure 19:
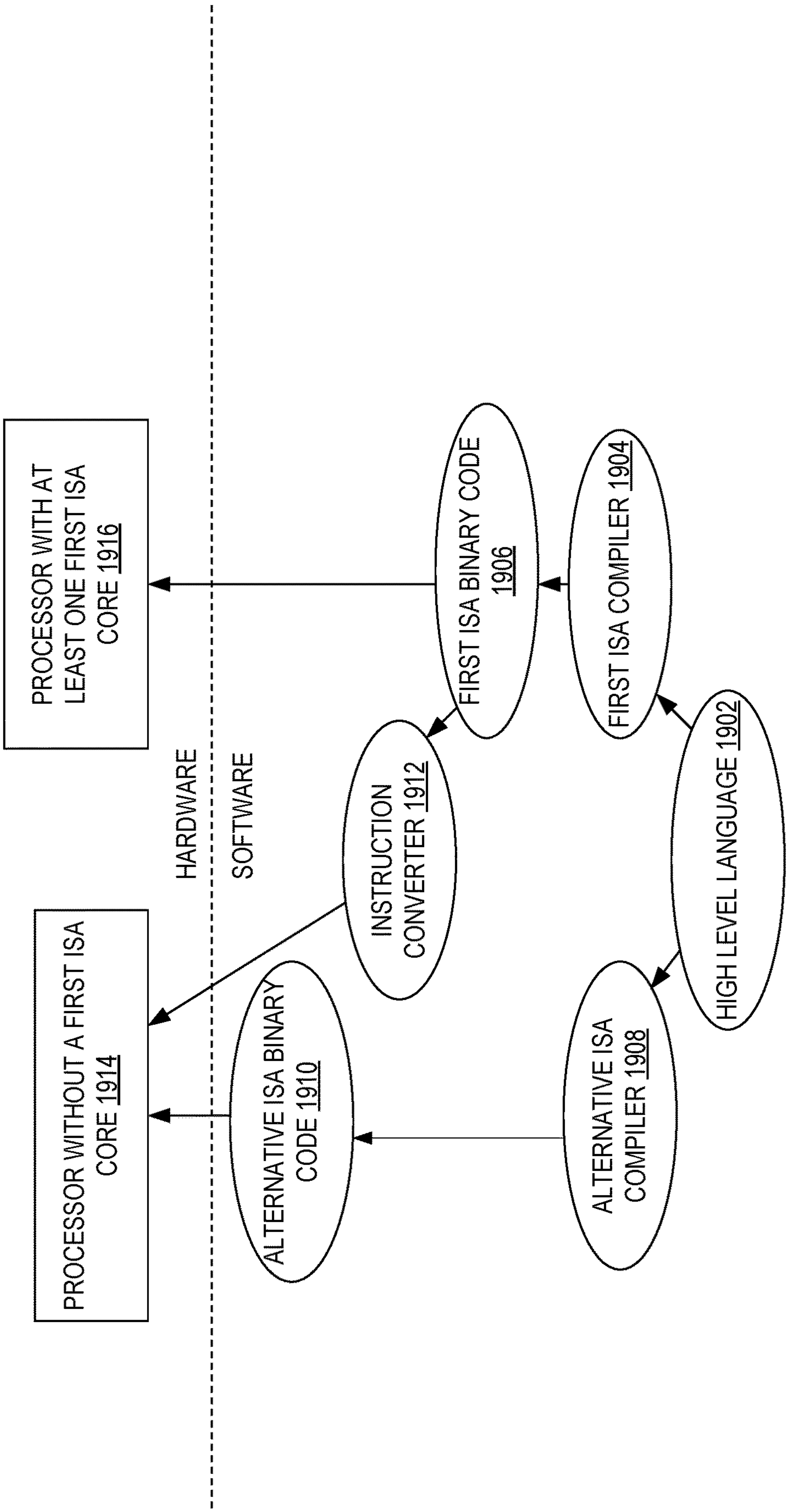
FIG. 19 is a block diagram illustrating the use of a software instruction converter to convert binary instructions in a source instruction set architecture to binary instructions in a target instruction set architecture according to examples.

The fetched single instruction of the first instruction set architecture is translated into one or more instructions of a second instruction set architecture at 702. This translation is performed by a translation and/or emulation layer of software in some examples. In some examples, this translation is performed by an instruction converter 1912 as shown in FIG. 19. In some examples, the translation is performed by hardware translation circuitry.

The one or more translated instructions of the second instruction set architecture are decoded at 703. For example, the translated instructions are decoded by decoder circuitry such as decoder circuitry 506 or decode circuitry 1040 detailed herein. In some examples, the operations of translation and decoding at 702 and 703 are merged.

Data values associated with the source operand(s) of the decoded one or more instructions of the second instruction set architecture are retrieved and the one or more instructions are scheduled at 705. For example, when one or more of the source operands are memory operands, the data from the indicated memory location is retrieved.

At 707, the decoded instruction(s) of the second instruction set architecture is/are executed by execution circuitry (hardware) such as execution circuit 106 shown in FIG. 1, execution circuitry 510 shown in FIG. 5, or execution cluster(s) 1060 shown in FIG. 10B, to perform the operation(s) indicated by the opcode of the single instruction of the first instruction set architecture. For the CALL (e.g., INDIRECT FUNCTION CALL CAPABILITY) instruction, the execution will cause execution circuitry to perform the operations described herein.

In some examples, the instruction is committed or retired at 709.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 8:
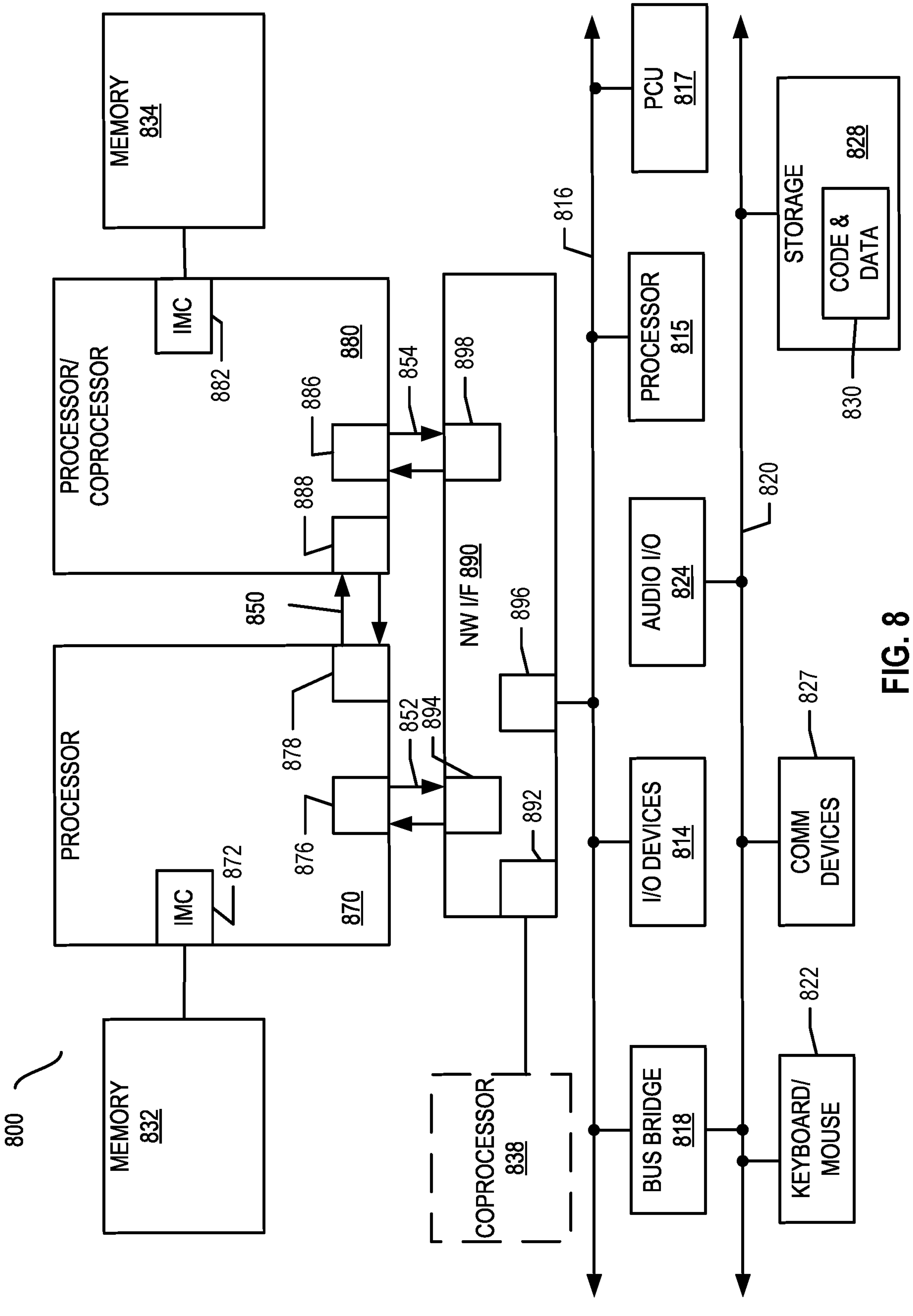
FIG. 8 illustrates an example computing system.

FIG. 8 illustrates an example computing system. Multiprocessor system 800 is an interfaced system and includes a plurality of processors or cores including a first processor 870 and a second processor 880 coupled via an interface 850 such as a point-to-point (P-P) interconnect, a fabric, and/or bus. In some examples, the first processor 870 and the second processor 880 are homogeneous. In some examples, first processor 870 and the second processor 880 are heterogenous. Though the example system 800 is shown to have two processors, the system may have three or more processors, or may be a single processor system. In some examples, the computing system is a system on a chip (SoC).

Processors 870 and 880 are shown including integrated memory controller (IMC) circuitry 872 and 882, respectively. Processor 870 also includes interface circuits 876 and 878; similarly, second processor 880 includes interface circuits 886 and 888. Processors 870, 880 may exchange information via the interface 850 using interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a network interface (NW I/F) 890 via individual interfaces 852, 854 using interface circuits 876, 894, 886, 898. The network interface 890 (e.g., one or more of an interconnect, bus, and/or fabric, and in some examples is a chipset) may optionally exchange information with a coprocessor 838 via an interface circuit 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via an interface such as P-P interconnect, such that either or both processors' local cache information may be stored in the shared cache if a processor is placed into a low power mode.

Network interface 890 may be coupled to a first interface 816 via interface circuit 896. In some examples, first interface 816 may be an interface such as a Peripheral Component Interconnect (PCI) interconnect, a PCI Express interconnect or another I/O interconnect. In some examples, first interface 816 is coupled to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interface 816, along with a bus bridge 818 which couples first interface 816 to a second interface 820. In some examples, one or more additional processor(s) 815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 816. In some examples, second interface 820 may be a low pin count (LPC) interface. Various devices may be coupled to second interface 820 including, for example, a keyboard and/or mouse 822, communication devices 827 and storage circuitry 828. Storage circuitry 828 may be one or more non-transitory machine-readable storage media as described below, such as a disk drive or other mass storage device which may include instructions/code and data 830 and may implement the storage 502 in some examples. Further, an audio I/O 824 may be coupled to second interface 820. Note that other architectures than the point-to-point architecture described above are possible. For example, instead of the point-to-point architecture, a system such as multiprocessor system 800 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU;

3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 9:
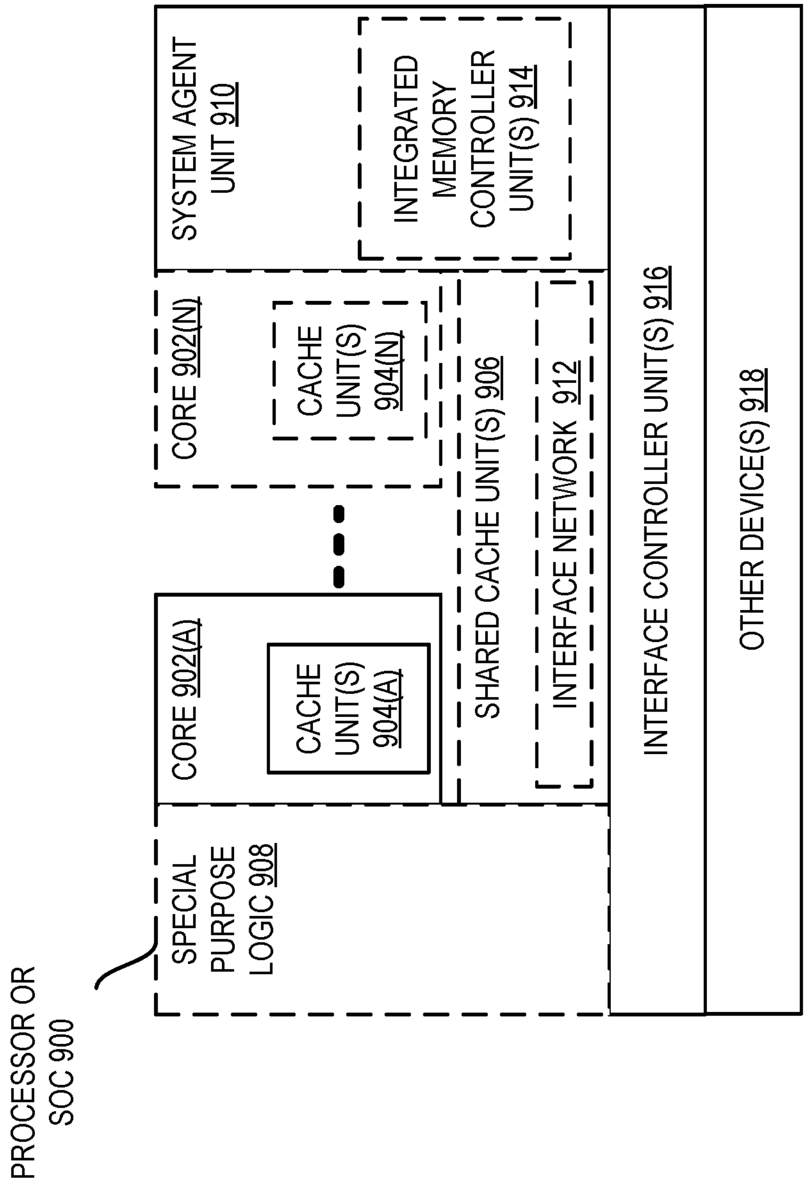
FIG. 9 illustrates a block diagram of an example processor and/or System on a Chip (SoC) that may have one or more cores and an integrated memory controller.

FIG. 9 illustrates a block diagram of an example processor and/or SoC 900 that may have one or more cores and an integrated memory controller. The solid lined boxes illustrate a processor 900 with a single core 902(A), system agent unit circuitry 910, and a set of one or more interface controller unit(s) circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interface controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor, or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904(A)-(N) within the cores 902(A)-(N), a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples interface network circuitry 912 (e.g., a ring interconnect) interfaces the special purpose logic 908 (e.g., integrated graphics logic), the set of shared cache unit(s) circuitry 906, and the system agent unit circuitry 910, alternative examples use any number of well-known techniques for interfacing such units. In some examples, coherency is maintained between one or more of the shared cache unit(s) circuitry 906 and cores 902(A)-(N). In some examples, interface controller units circuitry 916 couple the cores 902 to one or more other devices 918 such as one or more I/O devices, storage, one or more communication devices (e.g., wireless networking, wired networking, etc.), etc.

In some examples, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous in terms of instruction set architecture (ISA). Alternatively, the cores 902(A)-(N) may be heterogeneous in terms of ISA; that is, a subset of the cores 902(A)-(N) may be capable of executing an ISA, while other cores may be capable of executing only a subset of that ISA or another ISA.

Example Core Architectures—In-Order and Out-of-Order Core Block Diagram.

Figure 10A:
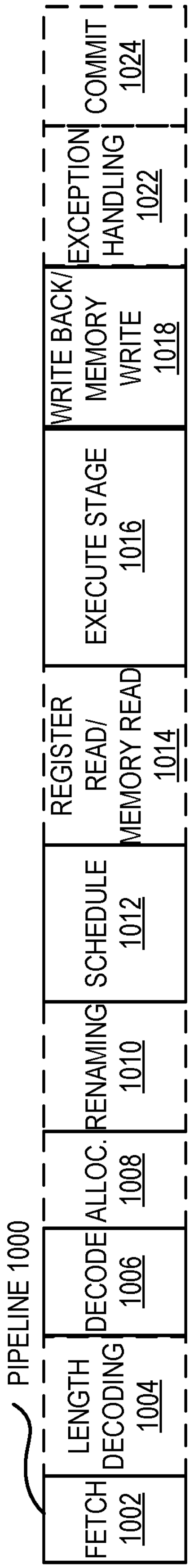
FIG. 10A is a block diagram illustrating both an example in-order pipeline and an example register renaming, out-of-order issue/execution pipeline according to examples.
Figure 10B:
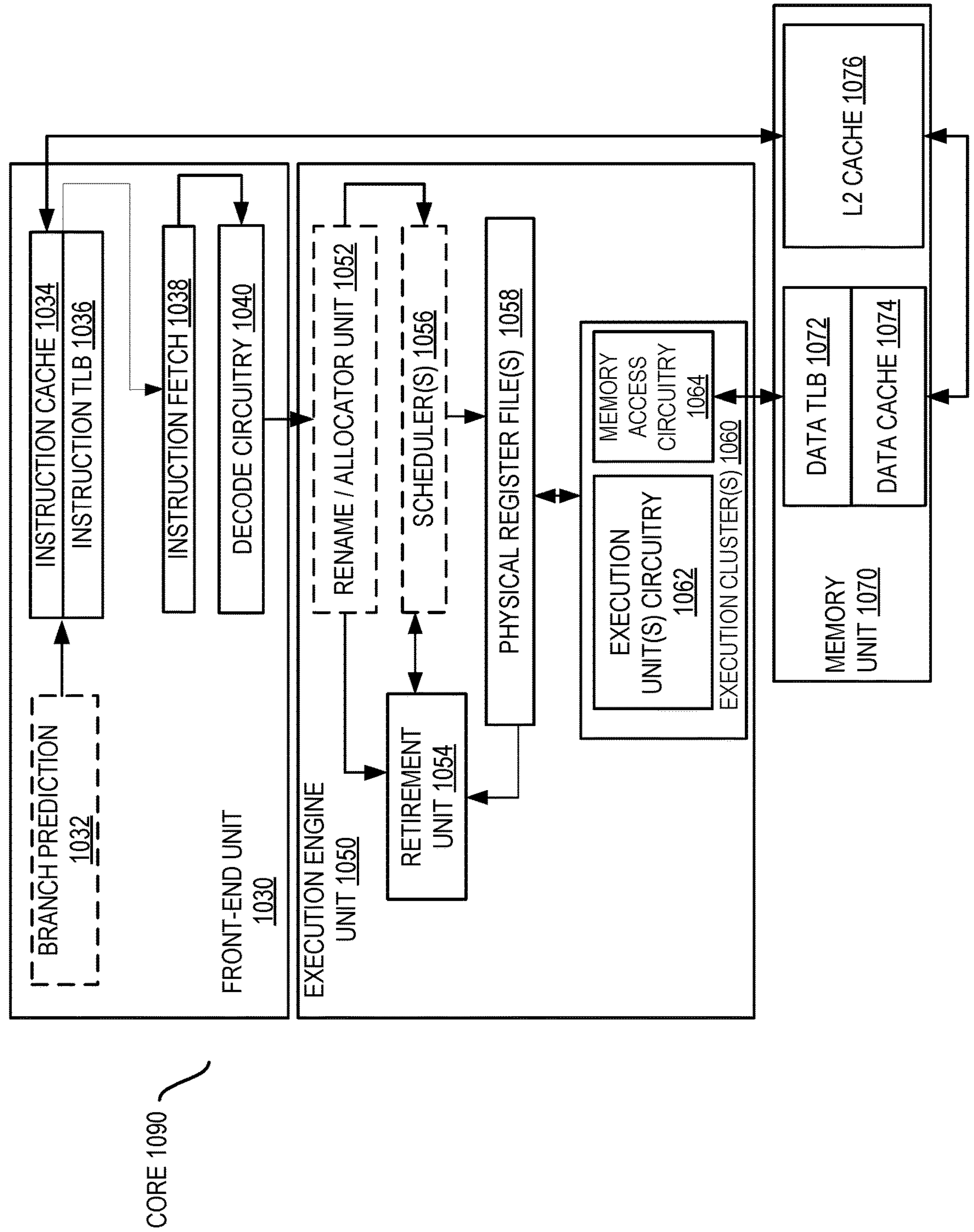
FIG. 10B is a block diagram illustrating both an example in-order architecture core and an example register renaming, out-of-order issue/execution architecture core to be included in a processor according to examples.

FIG. 10A is a block diagram illustrating both an example in-order pipeline and an example register renaming, out-of-order issue/execution pipeline according to examples. FIG. 10B is a block diagram illustrating both an example in-order architecture core and an example register renaming, out-of-order issue/execution architecture core to be included in a processor according to examples. The solid lined boxes in FIGS. 10A-10B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, an optional length decoding stage 1004, a decode stage 1006, an optional allocation (Alloc) stage 1008, an optional renaming stage 1010, a schedule (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, and during the decode stage 1006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1006 and the register read/memory read stage 1014 may be combined into one pipeline stage. In one example, during the execute stage 1016, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 10B may implement the pipeline 1000 as follows: 1) the instruction fetch circuitry 1038 performs the fetch and length decoding stages 1002 and 1004; 2) the decode circuitry 1040 performs the decode stage 1006; 3) the rename/allocator unit circuitry 1052 performs the allocation stage 1008 and renaming stage 1010; 4) the scheduler(s) circuitry 1056 performs the schedule stage 1012; 5) the physical register file(s) circuitry 1058 and the memory unit circuitry 1070 perform the register read/memory read stage 1014; the execution cluster(s) 1060 perform the execute stage 1016; 6) the memory unit circuitry 1070 and the physical register file(s) circuitry 1058 perform the write back/memory write stage 1018; 7) various circuitry may be involved in the exception handling stage 1022; and 8) the retirement unit circuitry 1054 and the physical register file(s) circuitry 1058 perform the commit stage 1024.

FIG. 10B shows a processor core 1090 including front-end unit circuitry 1030 coupled to execution engine unit circuitry 1050, and both are coupled to memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front-end unit circuitry 1030 may include branch prediction circuitry 1032 coupled to instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1040 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front-end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, address generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to data cache circuitry 1074 coupled to level 2 (L2) cache circuitry 1076. In one example, the memory access circuitry 1064 may include load unit circuitry, store address unit circuitry, and store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, level 3 (L3) cache circuitry (not shown), and/or main memory. The L2 cache circuitry 1076 is coupled to one or more other levels of cache and eventually to a main memory.

The core 1090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1090 includes logic to support a packed data instruction set architecture extension (e.g., AVX1, AVX2), thereby allowing the operations used by many multimedia applications to be performed using packed data.

Example Execution Unit(s) Circuitry.

Figure 11:
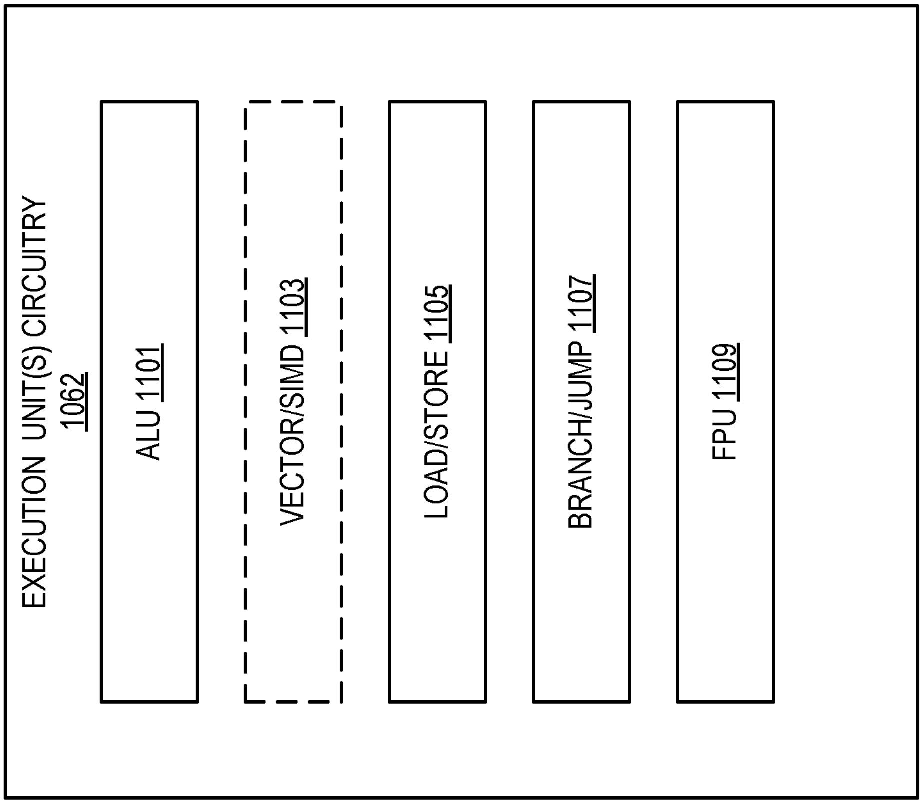
FIG. 11 illustrates examples of execution unit(s) circuitry.

FIG. 11 illustrates examples of execution unit(s) circuitry, such as execution unit(s) circuitry 1062 of FIG. 10B. As illustrated, execution unit(s) circuitry 1062 may include one or more ALU circuits 1101, optional vector/single instruction multiple data (SIMD) circuits 1103, load/store circuits 1105, branch/jump circuits 1107, and/or Floating-point unit (FPU) circuits 1109. ALU circuits 1101 perform integer arithmetic and/or Boolean operations. Vector/SIMD circuits 1103 perform vector/SIMD operations on packed data (such as SIMD/vector registers). Load/store circuits 1105 execute load and store instructions to load data from memory into registers or store from registers to memory. Load/store circuits 1105 may also generate addresses. Branch/jump circuits 1107 cause a branch or jump to a memory address depending on the instruction. FPU circuits 1109 perform floating-point arithmetic. The width of the execution unit(s) circuitry 1062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 12:
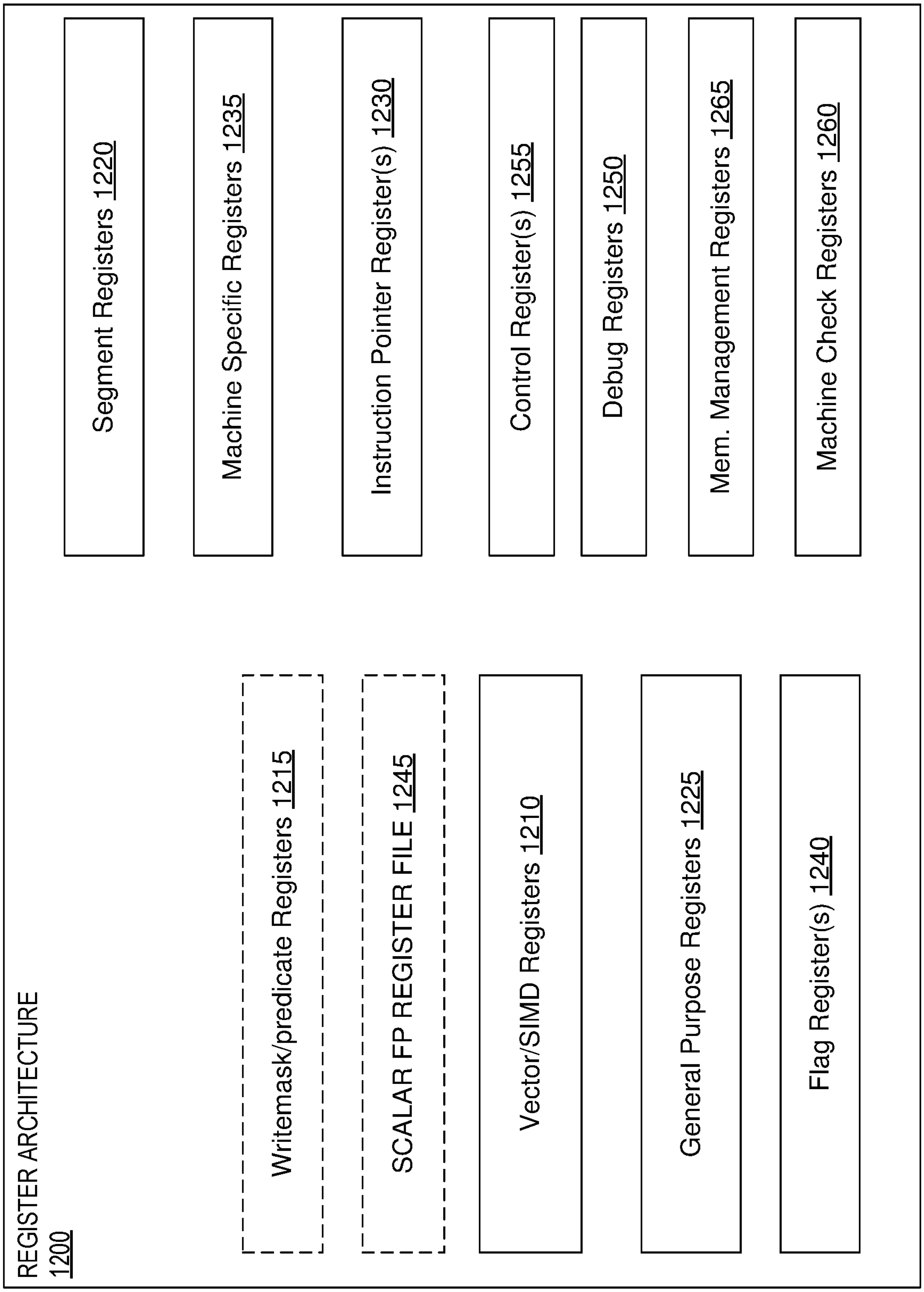
FIG. 12 is a block diagram of a register architecture according to some examples.

FIG. 12 is a block diagram of a register architecture 1200 according to some examples. As illustrated, the register architecture 1200 includes vector/SIMD registers 1210 that vary from 128-bit to 1,024 bits width. In some examples, the vector/SIMD registers 1210 are physically 512-bits and, depending upon the mapping, only some of the lower bits are used. For example, in some examples, the vector/SIMD registers 1210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1200 includes writemask/predicate registers 1215. For example, in some examples, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1215 corresponds to a data element position of the destination. In other examples, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1200 includes scalar floating-point (FP) register file 1245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some examples, the one or more flag registers 1240 are called program status and control registers.

Segment registers 1220 contain segment points for use in accessing memory. In some examples, these registers are referenced by the names CS, DS, SS, ES, FS, and GS.

Machine (e.g., model) specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory (mem) management registers 1265 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1200 may, for example, be used in register file/memory 508, or physical register file(s) circuitry 1058.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 13:
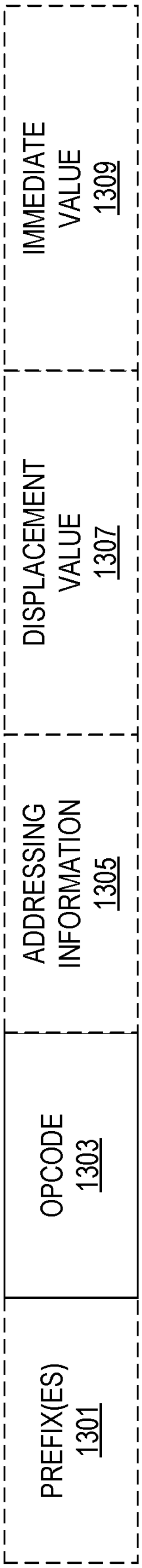
FIG. 13 illustrates examples of an instruction format.

FIG. 13 illustrates examples of an instruction format. As illustrated, an instruction may include multiple components including, but not limited to, one or more fields for: one or more prefixes 1301, an opcode 1303, addressing information 1305 (e.g., register identifiers, memory addressing information, etc.), a displacement value 1307, and/or an immediate value 1309. Note that some instructions utilize some or all the fields of the format whereas others may only use the field for the opcode 1303. In some examples, the order illustrated is the order in which these fields are to be encoded, however, it should be appreciated that in other examples these fields may be encoded in a different order, combined, etc.

The prefix(es) field(s) 1301, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered “legacy” prefixes. Other prefixes, one or more examples of which are detailed herein, indicate, and/or provide further capability, such as specifying particular registers, etc. The other prefixes typically follow the “legacy” prefixes.

The opcode field 1303 is used to at least partially define the operation to be performed upon a decoding of the instruction. In some examples, a primary opcode encoded in the opcode field 1303 is one, two, or three bytes in length. In other examples, a primary opcode can be a different length. An additional 3-bit opcode field is sometimes encoded in another field.

Figure 14:
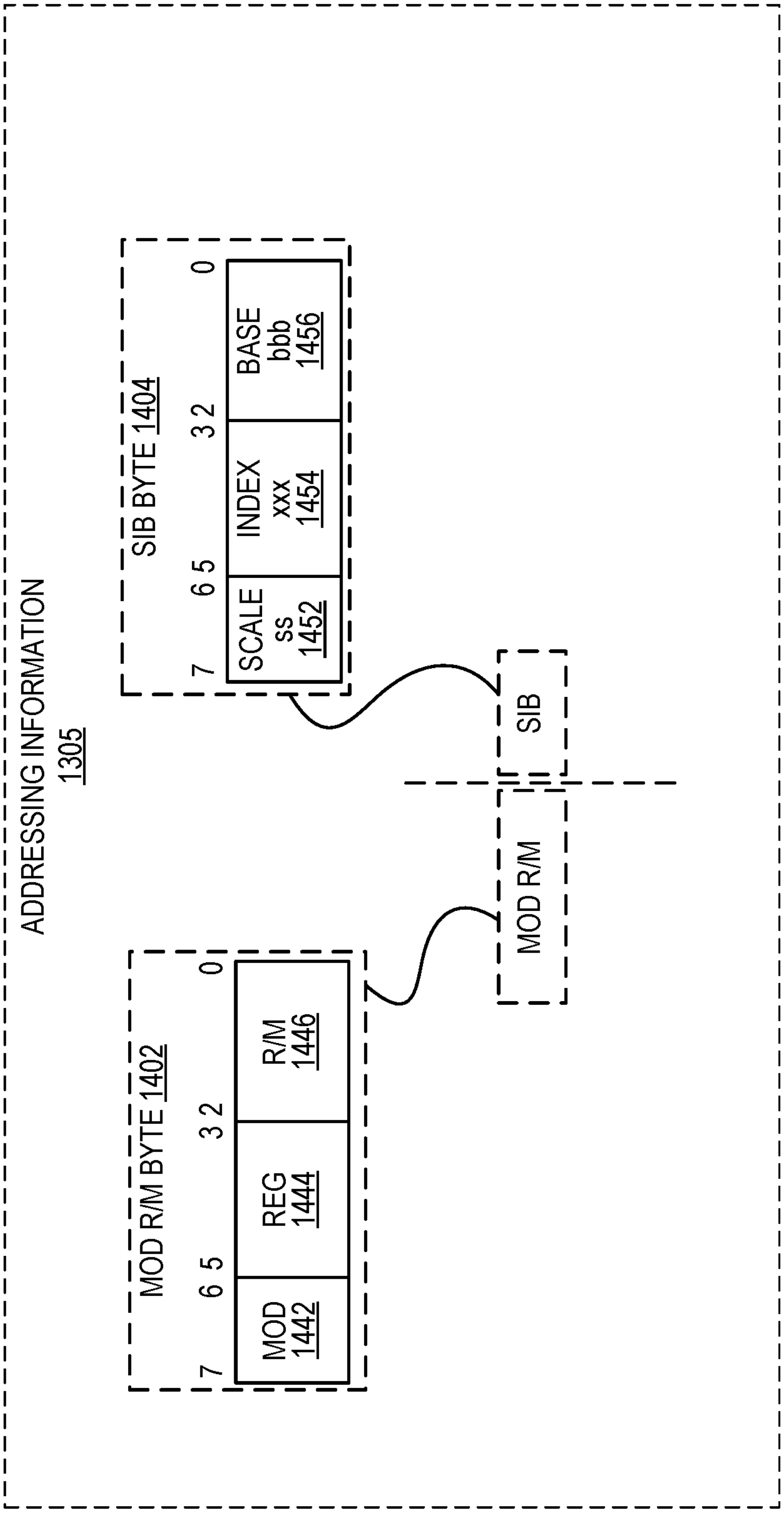
FIG. 14 illustrates examples of an addressing information field.

The addressing information field 1305 is used to address one or more operands of the instruction, such as a location in memory or one or more registers. FIG. 14 illustrates examples of the addressing information field 1305. In this illustration, an optional MOD R/M byte 1402 and an optional Scale, Index, Base (SIB) byte 1404 are shown. The MOD R/M byte 1402 and the SIB byte 1404 are used to encode up to two operands of an instruction, each of which is a direct register or effective memory address. Note that both of these fields are optional in that not all instructions include one or more of these fields. The MOD R/M byte 1402 includes a MOD field 1442, a register (reg) field 1444, and R/M field 1446.

The content of the MOD field 1442 distinguishes between memory access and non-memory access modes. In some examples, when the MOD field 1442 has a binary value of 11 (11b), a register-direct addressing mode is utilized, and otherwise a register-indirect addressing mode is used.

The register field 1444 may encode either the destination register operand or a source register operand or may encode an opcode extension and not be used to encode any instruction operand. The content of register field 1444, directly or through address generation, specifies the locations of a source or destination operand (either in a register or in memory). In some examples, the register field 1444 is supplemented with an additional bit from a prefix (e.g., prefix 1301) to allow for greater addressing.

The R/M field 1446 may be used to encode an instruction operand that references a memory address or may be used to encode either the destination register operand or a source register operand. Note the R/M field 1446 may be combined with the MOD field 1442 to dictate an addressing mode in some examples.

The SIB byte 1404 includes a scale field 1452, an index field 1454, and a base field 1456 to be used in the generation of an address. The scale field 1452 indicates a scaling factor. The index field 1454 specifies an index register to use. In some examples, the index field 1454 is supplemented with an additional bit from a prefix (e.g., prefix 1301) to allow for greater addressing. The base field 1456 specifies a base register to use. In some examples, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1307 provides this value. Additionally, in some examples, a displacement factor usage is encoded in the MOD field of the addressing information field 1305 that indicates a compressed displacement scheme for which a displacement value is calculated and stored in the displacement field 1307.

In some examples, the immediate value field 1309 specifies an immediate value for the instruction. An immediate value may be encoded as a 1-byte value, a 2-byte value, a 4-byte value, etc.

Figure 15:
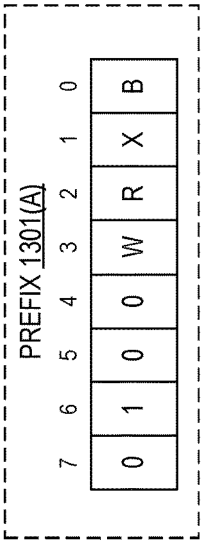
FIG. 15 illustrates examples of a first prefix.

FIG. 15 illustrates examples of a first prefix 1301(A). In some examples, the first prefix 1301(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the MOD R/M byte 1402; 2) using the MOD R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may be an extension of the MOD R/M reg field 1444 and may be used to modify the MOD R/M reg field 1444 when that field encodes a general-purpose register, a 64-bit packed data register (e.g., an SSE register), or a control or debug register. R is ignored when MOD R/M byte 1402 specifies other registers or defines an extended opcode.

Bit position 1 (X) may modify the SIB byte index field 1454.

Bit position 0 (B) may modify the base in the MOD R/M R/M field 1446 or the SIB byte base field 1456; or it may modify the opcode register field used for accessing general purpose registers (e.g., general purpose registers 1225).

Figure 16A:
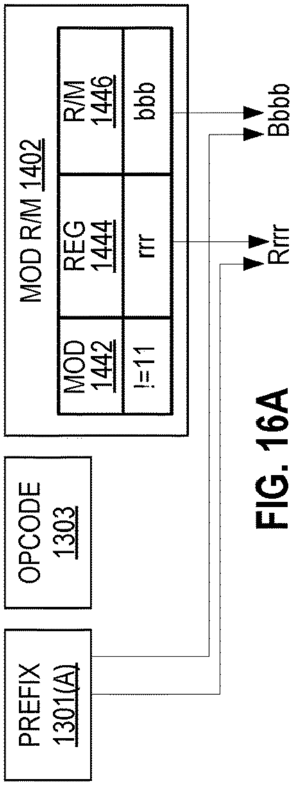
FIGS. 16A-16D illustrate examples of how the R, X, and B fields of the first prefix in FIG. 15 are used.
Figure 16B:
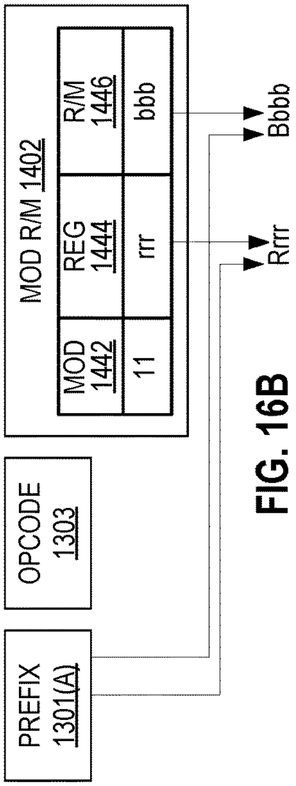
Figure 16C:
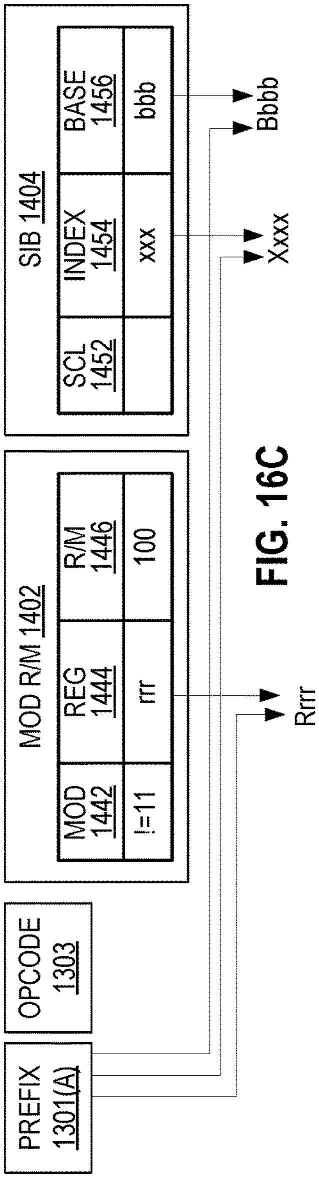
Figure 16D:
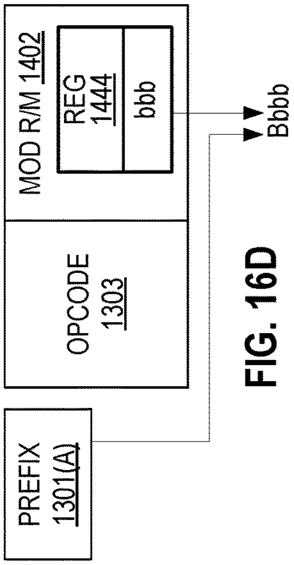

FIGS. 16A-16D illustrate examples of how the R, X, and B fields of the first prefix 1301(A) are used. FIG. 16A illustrates R and B from the first prefix 1301(A) being used to extend the reg field 1444 and R/M field 1446 of the MOD R/M byte 1402 when the SIB byte 1404 is not used for memory addressing. FIG. 16B illustrates R and B from the first prefix 1301(A) being used to extend the reg field 1444 and R/M field 1446 of the MOD R/M byte 1402 when the SIB byte 1404 is not used (register-register addressing). FIG. 16C illustrates R, X, and B from the first prefix 1301(A) being used to extend the reg field 1444 of the MOD R/M byte 1402 and the index field 1454 and base field 1456 when the SIB byte 1404 being used for memory addressing. FIG. 16D illustrates B from the first prefix 1301(A) being used to extend the reg field 1444 of the MOD R/M byte 1402 when a register is encoded in the opcode 1303.

Figure 17A:
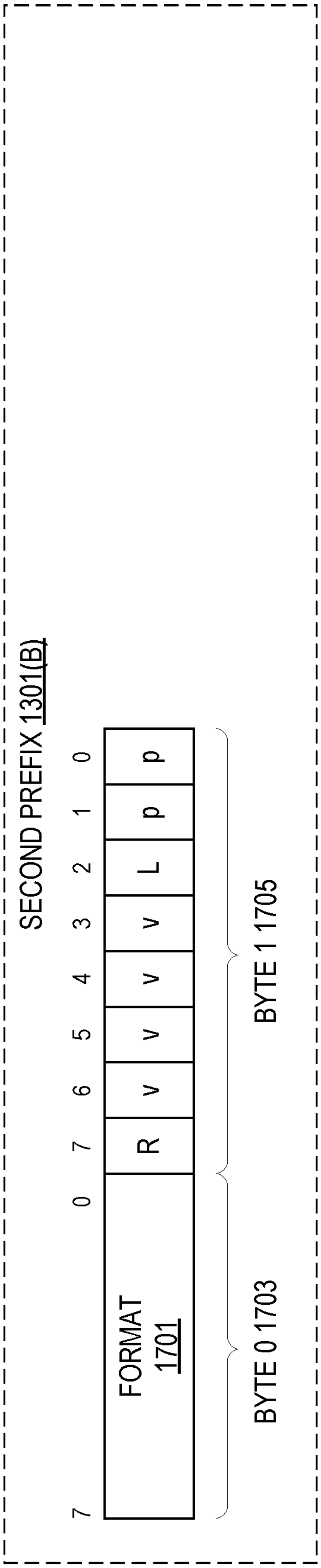
FIGS. 17A-17B illustrate examples of a second prefix.
Figure 17B:
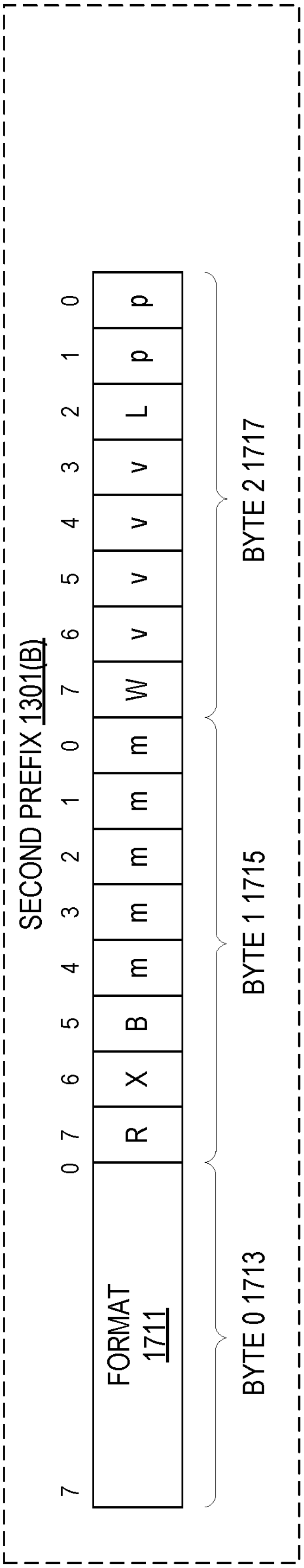

FIGS. 17A-17B illustrate examples of a second prefix 1301(B). In some examples, the second prefix 1301(B) is an example of a VEX prefix. The second prefix 1301(B) encoding allows instructions to have more than two operands, and allows SIMD vector registers (e.g., vector/SIMD registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some examples, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17A illustrates examples of a two-byte form of the second prefix 1301(B). In one example, a format field 1701 (byte 0 1703) contains the value C5H. In one example, byte 1 1705 includes an "R" value in bit[7]. This value is the complement of the "R" value of the first prefix 1301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1446 to encode the instruction operand that references a memory address or encode either the destination register operand or a source register operand.

Instructions that use this prefix may use the MOD R/M reg field 1444 to encode either the destination register operand or a source register operand, or to be treated as an opcode extension and not used to encode any instruction operand.

For instruction syntax that support four operands, vvvv, the MOD R/M R/M field 1446 and the MOD R/M reg field 1444 encode three of the four operands. Bits[7:4] of the immediate value field 1309 are then used to encode the third source register operand.

FIG. 17B illustrates examples of a three-byte form of the second prefix 1301(B). In one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as needed, one or more implied leading opcode bytes. For example, 00001 implies a 0FH leading opcode, 00010 implies a 0F38H leading opcode, 00011 implies a 0F3AH leading opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (is complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the MOD R/M R/M field 1446 to encode the instruction operand that references a memory address or encode either the destination register operand or a source register operand.

Instructions that use this prefix may use the MOD R/M reg field 1444 to encode either the destination register operand or a source register operand, or to be treated as an opcode extension and not used to encode any instruction operand.

For instruction syntax that support four operands, vvvv, the MOD R/M R/M field 1446, and the MOD R/M reg field 1444 encode three of the four operands. Bits[7:4] of the immediate value field 1309 are then used to encode the third source register operand.

Figure 18:
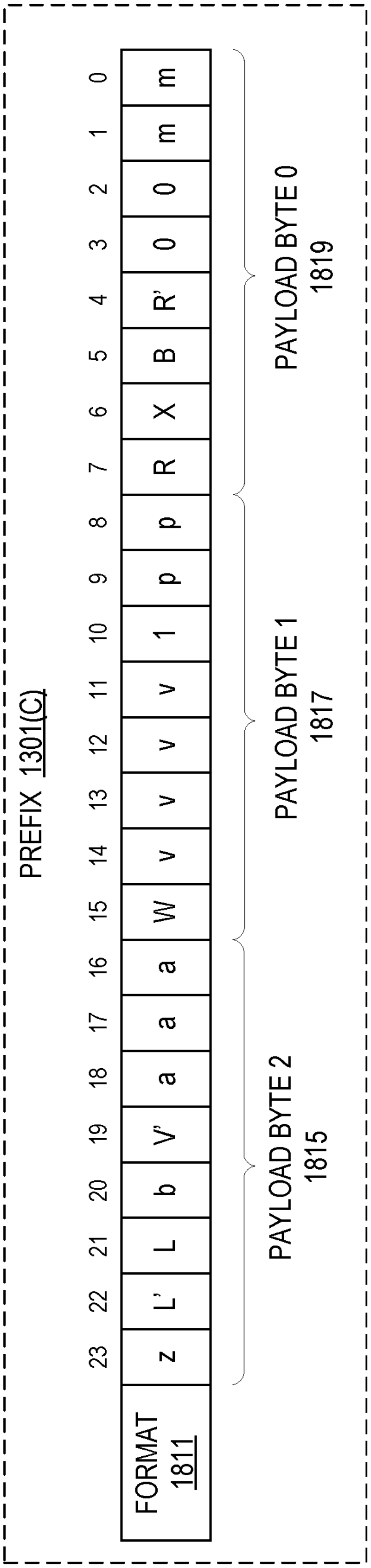
FIG. 18 illustrates examples of a third prefix.

FIG. 18 illustrates examples of a third prefix 1301(C). In some examples, the third prefix 1301(C) is an example of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 12) or predication utilize this prefix. Opmask register allows for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 62H. Subsequent bytes are referred to as payload bytes 1815-1819 and collectively form a 24-bit value of P[23:0] providing specific capability in the form of one or more fields (detailed herein).

In some examples, P[1:0] of payload byte 1819 are identical to the low two mm bits. P[3:2] are reserved in some examples. Bit P[4] (R') allows access to the high 16 vector register set when combined with P[7] and the MOD R/M reg field 1444. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1444 and MOD R/M R/M field 1446. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (is complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 1301(A) and second prefix 1311(B) and may serve as an opcode extension bit or operand size promotion.

P[18:16] specify the index of a register in the opmask (writemask) registers (e.g., writemask/predicate registers 1215). In one example, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differ across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 1301(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | MOD R/M reg | GPR, Vector | Destination or Source |
| VVVV | V' | | vvvv | GPR, Vector | 2nd Source or Destination |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first ISA core 1916. The processor with at least one first ISA core 1916 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 1904 represents a compiler that is operable to generate first ISA binary code 1906 (e.g., object code) that can, with or without additional linkage processing, be executed on the processor with at least one first ISA core 1916. Similarly, FIG. 19 shows the program in the high-level language 1902 may be compiled using an alternative ISA compiler 1908 to generate alternative ISA binary code 1910 that may be natively executed by a processor without a first ISA core 1914. The instruction converter 1912 is used to convert the first ISA binary code 1906 into code that may be natively executed by the processor without a first ISA core 1914. This converted code is not necessarily to be the same as the alternative ISA binary code 1910; however, the converted code will accomplish the general operation and be made up of instructions from the alternative ISA. Thus, the instruction converter 1912 represents software, firmware, hardware, or a combination thereof that, through emulation, simulation or any other process, allows a processor or other electronic device that does not have a first ISA processor or core to execute the first ISA binary code 1906.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

a capability management circuit to check a capability for a memory access request for a memory, the capability comprising an address field and a bounds field that is to indicate a lower bound and an upper bound of an address space to which the capability authorizes access;

a decoder circuit to decode a single instruction into a decoded single instruction, the single instruction comprising:

a first capability to indicate a first call table comprising a respective entry for each of a plurality of functions of a first type, a field to indicate a first offset of a first entry for a first function requested for execution, and an opcode to indicate the capability management circuit is to perform a first check that the first offset is within a lower bound and an upper bound of the first capability and a second check that the first offset is a permitted offset for the entries in the first call table, and in response to the first check and the second check both passing, cause an execution circuit to execute the first function; and the execution circuit to execute the decoded single instruction according to the opcode.

2. The apparatus of claim 1, wherein the execution circuit is to, in response to the second check indicating that the first offset is not the permitted offset, cause the single instruction to fault.

3. The apparatus of claim 2, wherein the execution circuit is to, in response to the first check indicating that the first offset is beyond the lower bound or the upper bound of the first capability, cause the single instruction to fault.

4. The apparatus of claim 3, wherein the execution circuit is to, in response to a third check indicating that a validity tag of the first capability is not set, cause the single instruction to fault.

5. The apparatus of claim 1, wherein an object type field of the first capability is to indicate the first capability is for a call table type of object.

6. The apparatus of claim 1, wherein a prefix of the first capability is to indicate the first capability is for a call table type of object.

7. The apparatus of claim 1, wherein the first entry in the first call table comprises a second capability for the first function in the memory, and the opcode is to indicate that the execution circuit is to cause the capability management circuit to perform a third check that the first function is authorized by the second capability for execution, and in response to the first check, the second check, and the third check all passing, cause the execution circuit to execute the first function.

8. A method comprising:

checking, by a capability management circuit of a processor, a capability for a memory access request for a memory, the capability comprising an address field and a bounds field that is to indicate a lower bound and an upper bound of an address space to which the capability authorizes access;

decoding, by a decoder circuit of the processor, a single instruction into a decoded single instruction, the single instruction comprising:

a first capability to indicate a first call table comprising a respective entry for each of a plurality of functions of a first type, a field to indicate a first offset of a first entry for a first function requested for execution, and an opcode to indicate the capability management circuit is to perform a first check that the first offset is within a lower bound and an upper bound of the first capability and a second check that the first offset is a permitted offset for the entries in the first call table, and in response to the first check and the second check both passing, cause an execution circuit to execute the first function; and executing, by the execution circuit, the decoded single instruction according to the opcode.

9. The method of claim 8, wherein, in response to the second check indicating that the first offset is not the permitted offset, the executing causes the single instruction to fault.

10. The method of claim 9, wherein, in response to the first check indicating that the first offset is beyond the lower bound or the upper bound of the first capability, the executing causes the single instruction to fault.

11. The method of claim 10, wherein, in response to a third check indicating that a validity tag of the first capability is not set, the executing causes the single instruction to fault.

12. The method of claim 8, wherein an object type field of the first capability is to indicate the first capability is for a call table type of object.

13. The method of claim 8, wherein a prefix of the first capability is to indicate the first capability is for a call table type of object.

14. The method of claim 8, wherein the first entry in the first call table comprises a second capability for the first function in the memory, and the opcode is to indicate that the capability management circuit is to perform a third check that the first function is authorized by the second capability for execution, and in response to the first check, the second check, and the third check all passing, cause the execution circuit to execute the first function.

15. A non-transitory machine-readable medium that stores code that when executed by a machine causes the machine to perform a method comprising:

checking, by a capability management circuit of a processor, a capability for a memory access request for a memory, the capability comprising an address field and a bounds field that is to indicate a lower bound and an upper bound of an address space to which the capability authorizes access;

decoding, by a decoder circuit of the processor, a single instruction into a decoded single instruction, the single instruction comprising:

a first capability to indicate a first call table comprising a respective entry for each of a plurality of functions of a first type, a field to indicate a first offset of a first entry for a first function requested for execution, and an opcode to indicate the capability management circuit is to perform a first check that the first offset is within a lower bound and an upper bound of the first capability and a second check that the first offset is a permitted offset for the entries in the first call table, and in response to the first check and the second check both passing, cause an execution circuit to execute the first function; and executing, by the execution circuit, the decoded single instruction according to the opcode.

16. The non-transitory machine-readable medium of claim 15, wherein, in response to the second check indicating that the first offset is not the permitted offset, the executing causes the single instruction to fault.

17. The non-transitory machine-readable medium of claim 16, wherein, in response to the first check indicating that the first offset is beyond the lower bound or the upper bound of the first capability, the executing causes the single instruction to fault.

18. The non-transitory machine-readable medium of claim 15, wherein an object type field of the first capability is to indicate the first capability is for a call table type of object.

19. The non-transitory machine-readable medium of claim 15, wherein a prefix of the first capability is to indicate the first capability is for a call table type of object.

20. The non-transitory machine-readable medium of claim 15, wherein the first entry in the first call table comprises a second capability for the first function in the memory, and the opcode is to indicate that the capability management circuit is to perform a third check that the first function is authorized by the second capability for execution, and in response to the first check, the second check, and the third check all passing, cause the execution circuit to execute the first function.

* * * * *